United States Patent
Tang et al.

(10) Patent No.: US 11,663,663 B2
(45) Date of Patent: May 30, 2023

(54) IMAGE ANALYSIS AND IDENTIFICATION USING MACHINE LEARNING WITH OUTPUT ESTIMATION

(71) Applicant: Capital One Services, LLC, McLean, VA (US)

(72) Inventors: Qiaochu Tang, The Colony, TX (US); Sunil Subrahmanyam Vasisht, Flowermound, TX (US); Stephen Michael Wylie, Carrollton, TX (US); Geoffrey Dagley, McKinney, TX (US); Micah Price, Plano, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/936,147

(22) Filed: Sep. 28, 2022

(65) Prior Publication Data

US 2023/0073709 A1 Mar. 9, 2023

Related U.S. Application Data

(63) Continuation of application No. 17/092,578, filed on Nov. 9, 2020, now Pat. No. 11,494,838, which is a continuation of application No. 16/553,478, filed on Aug. 28, 2019, now Pat. No. 10,853,876, which is a continuation of application No. 15/916,218, filed on Mar. 8, 2018, now Pat. No. 10,430,876.

(51) Int. Cl.
*G06Q 40/03* (2023.01)
*G06N 20/00* (2019.01)

(52) U.S. Cl.
CPC ............ *G06Q 40/03* (2023.01); *G06N 20/00* (2019.01)

(58) Field of Classification Search
CPC ...................................................... G06Q 40/03
USPC ............................................................. 705/38
See application file for complete search history.

(56) References Cited

U.S. PATENT DOCUMENTS

| | | | |
|---|---|---|---|
| 9,875,426 | B2 | 1/2018 | Tohidi |
| 10,319,007 | B1 | 6/2019 | Tang et al. |
| 10,325,315 | B1 | 6/2019 | Tang et al. |
| 10,395,313 | B1 | 8/2019 | Tang et al. |
| 10,748,195 | B2 | 8/2020 | Tang et al. |
| 10,762,562 | B2 | 9/2020 | Tang et al. |
| 10,783,580 | B2 | 9/2020 | Tang et al. |
| 2012/0230548 | A1 | 9/2012 | Caiman et al. |
| 2013/0290036 | A1 | 10/2013 | Strange et al. |
| 2013/0329943 | A1 | 12/2013 | Christopuios et al. |

(Continued)

*Primary Examiner* — Lindsay M Maguire
(74) *Attorney, Agent, or Firm* — Finnegan, Henderson, Farabow, Garrett & Dunner L.L.P

(57) ABSTRACT

The present disclosure relates to systems and methods for generating real-time quotes using machine learning algorithms. The system may include a processor in communication with a client device, and a storage medium storing instructions that, when executed, cause the processor to perform operations including: receiving an image of a vehicle from the client device, extracting one or more features from the image, based on the extracted features and using a machine learning algorithm, identifying one or more attributes of the vehicle, based on the identified attributes of the vehicle, determining a make and a model of the vehicle, obtaining comparison information based at least in part on the determined make and model, estimating a quote for the vehicle based on the comparison information; and transmitting the estimated quote for display on the client device.

20 Claims, 18 Drawing Sheets

(56) References Cited

U.S. PATENT DOCUMENTS

| | | |
|---|---|---|
| 2017/0083796 A1 | 3/2017 | Kim et al. |
| 2017/0262750 A1 | 9/2017 | Kozuka et al. |
| 2018/0150956 A1 | 5/2018 | Kao et al. |

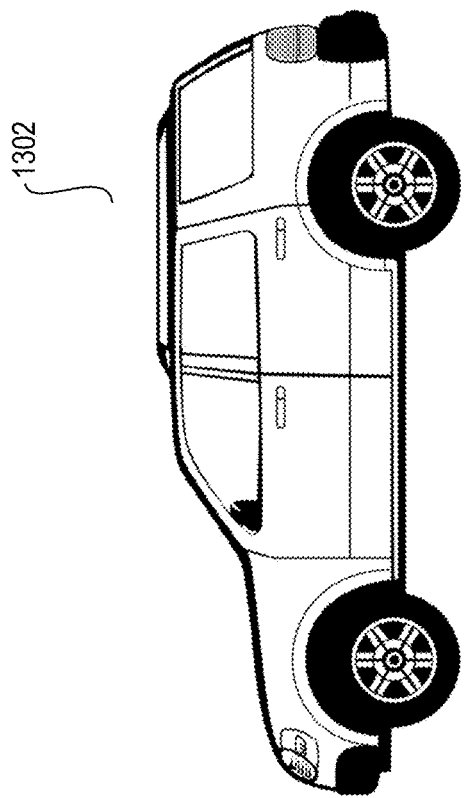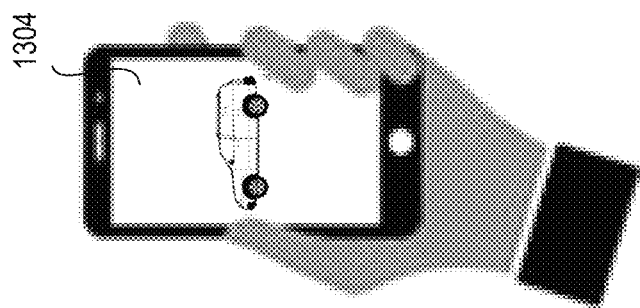
FIG. 13

IMAGE ANALYSIS AND IDENTIFICATION USING MACHINE LEARNING WITH OUTPUT ESTIMATION

CROSS-REFERENCE TO RELATED APPLICATIONS

This application is a continuation of U.S. application Ser. No. 17/092,578, filed Nov. 9, 2020, which is a continuation of U.S. application Ser. No. 16/553,478, filed Aug. 28, 2019, which issued on Dec. 1, 2020 as U.S. Pat. No. 10,853,876, which is a continuation of U.S. patent application Ser. No. 15/916,218, filed Mar. 8, 2018, which issued on Oct. 1, 2019 as U.S. Pat. No. 10,430,876. The disclosures of the above-referenced applications are expressly incorporated herein by reference in their entireties.

TECHNICAL FIELD

The present disclosure relates generally to the field of image analysis using machine learning algorithms. More specifically, and without limitation, this disclosure relates to systems and methods for using machine learning algorithms to identify vehicles from images and generate real-time quotes.

BACKGROUND

Customers have limited methods for receiving accurate quotes and pricing when attempting to finance a vehicle purchase. For example, in a typical method, a customer visits an automobile dealership and selects a vehicle to purchase. After negotiating the vehicle price, the customer then fills out a lengthy credit application at the dealership and provides any information needed to complete the financing. After receiving dealership credit approval, the customer signs a contract reflecting the purchase and financing terms, such as the monthly payments and Annual Percentage Rate (APR).

Alternatively, some customers apply to prequalify for a loan before choosing a vehicle. Here, the customer fills out an application and provides information relating to their income, employment, residence, desired financing amount, and other required personal details. If the customer's application is approved, the lender provides an estimate of the financing details and a maximum amount approved for the vehicle purchase. The customer visits an automobile dealership with the approved pre-qualification and selects a vehicle to purchase. The customer then fills out another credit application and provides any further information required to complete the financing. After receiving dealership credit approval, the customer signs a contract reflecting the purchase and financing terms.

Such known techniques for auto financing suffer from multiple drawbacks, however. For example, customers must endure a lengthy, manual, and multi-step process to secure financing for a vehicle. Attempting to use existing pre-qualification methods can provide inaccurate quotes and financing terms. Furthermore, actual vehicle information may not be available at the time the customer seeks financing. Moreover, attempting to obtain more accurate pricing quotes by choosing a specific vehicle before seeking financing can limit the ability of a customer to change their minds. For example, should the customer decide at the dealership to purchase a different vehicle, a common event, the customer may need to reapply for financing for this new vehicle.

A need therefore exists for systems and methods for providing on-demand auto financing quotes for specified vehicles in real time. The disclosed systems and methods provide a technological solution to at least this existing problem.

SUMMARY

Embodiments of the present disclosure use machine learning systems and methods to provide on-demand auto financing quotes for specified vehicles in real time. The resulting quotes can be displayed using augmented reality systems and methods on a device of the user. In this manner, the disclosed embodiments can provide a marked improvement over the subjective, manual, and multi-step processes known in the prior art.

Disclosed embodiments may include a system for processing an image including a vehicle using machine learning. The system may comprise a processor in communication with a client device; and a storage medium storing instructions. When executed, the instructions may configure the processor to perform operations comprising receiving an image of a vehicle from the client device. The operations may also include extracting one or more features from the image. The operations may also include identifying, based on the extracted features and using a machine learning algorithm, one or more attributes of the vehicle. The operations may also include determining, based on the identified attributes of the vehicle, a make and a model of the vehicle. The operations may also include obtaining comparison information based at least in part on the determined make and model. The operations may also include estimating a quote for the vehicle based on the comparison information and transmitting the estimated quote for display on the client device.

Disclosed embodiments may include a method for processing an image including a vehicle using machine learning. The method may include receiving an image of a vehicle from a client device. The method may also include extracting one or more features from the image. The method may also include identifying, based on the extracted features and using a machine learning algorithm, one or more attributes of the vehicle. The method may also include determining, based on the identified attributes of the vehicle, a make and a model of the vehicle. The method may also include obtaining comparison information based at least in part on the determined make and model. The method may also include estimating a quote for the vehicle based on the comparison information. The method may also include transmitting the estimated quote for display on the client device.

In accordance with additional embodiments of the present disclosure, a computer-readable medium is disclosed that stores instructions that, when executed by a processor(s), causes the processor(s) to perform operations consistent with one or more disclosed methods.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 13 is an illustration of a client device capturing an image of a vehicle, in accordance with disclosed embodiments.

DETAILED DESCRIPTION

The disclosed embodiments relate to systems and methods for generating real-time quotes for vehicles. Reference will now be made in detail to exemplary embodiments and aspects of the present disclosure, examples of which are illustrated in the accompanying drawings. While numerous specific details are set forth in order to provide a thorough understanding of the disclosed example embodiments, it would be understood by those skilled in the art that the principles of the example embodiments may be practiced without every specific detail. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

As used herein, the term "image" may connote digital information stored in an appropriate format, for example, static image formats (e.g., bitmap, Graphics Interchange Format ("GIF"), Portable Network Graphics format ("PNG"), Joint Photographic Experts Group ("JPEG")) or dynamic formats (e.g., animated GIF, MPEG-4, Flash Video ("FLV"), Windows Media Video ("WMV")).

Figure 1:
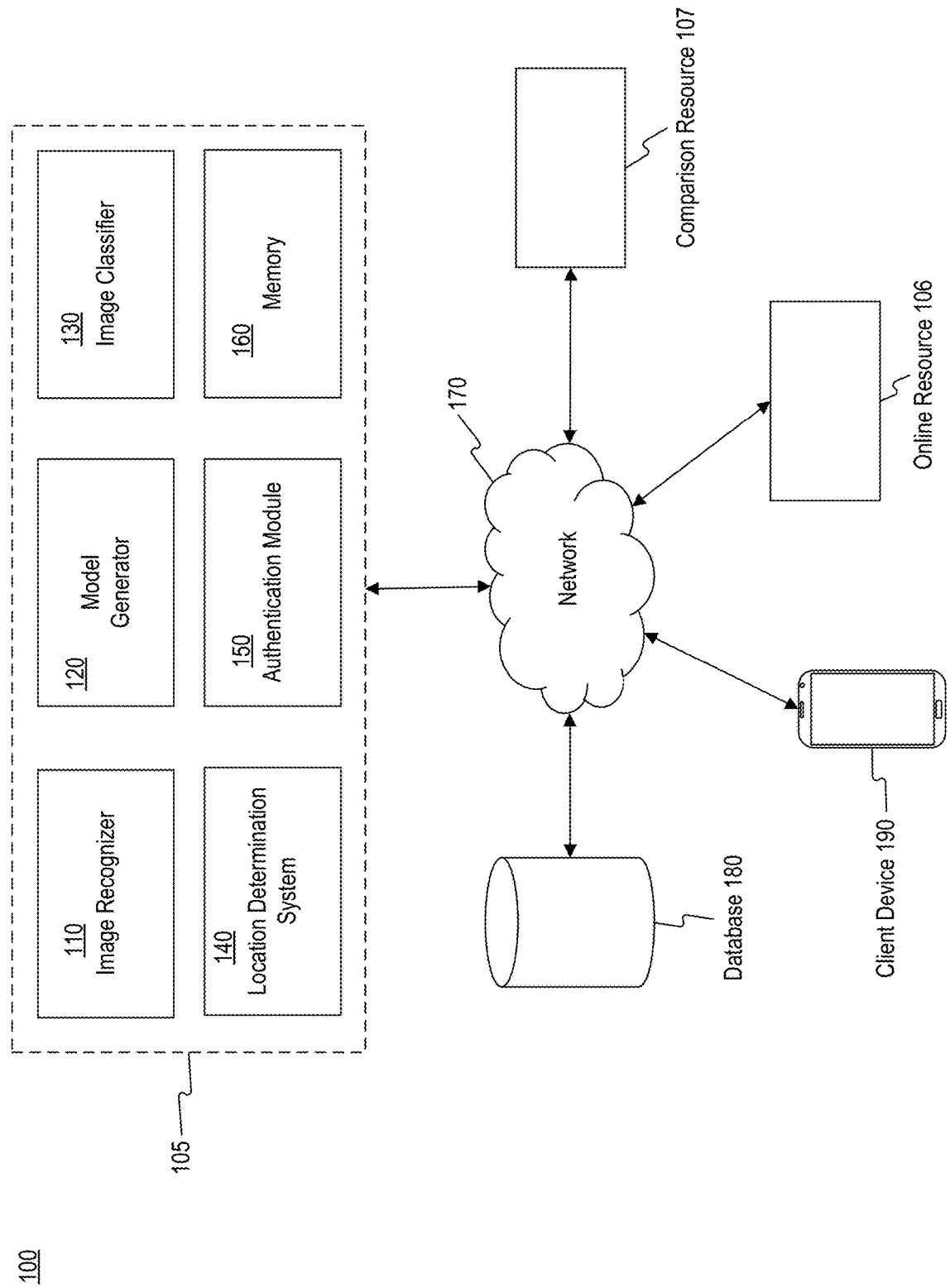
FIG. 1 is a block diagram of an exemplary system, in accordance with disclosed embodiments.

FIG. 1 is a block diagram of an exemplary system 100. System 100 may be used to identify a vehicle and associated vehicle attributes (e.g., make, model, trim, year, color, etc.) based on an image of the vehicle, in accordance with disclosed embodiments. System 100 may include a server system 105 which may include an image recognizer 110, a model generator 120, an image classifier 130, a location determination system 140, an authentication module 150, and a memory 160. System 100 may additionally include online resource 106, comparison resource 107, database 180, and client device 190. In some embodiments, as shown in FIG. 1, each component of system 100 may be connected to a network 170. However, in other embodiments components of system 100 may be connected directly with each other, without network 170.

Online resource 106 may include one or more servers or storage services provided by one or more service providers, such as a provider of website hosting, networking, cloud, or backup services. In some embodiments, online resource 106 may be associated with hosting services or servers that store web pages for vehicle manufacturers and/or vehicle dealers. In other embodiments, online resource 106 may be associated with a cloud computing service such as Microsoft Azure™ or Amazon Web Services™. In yet other embodiments, online resource 106 may be associated with a messaging service, such as, for example, Apple Push Notification Service, Azure Mobile Services, or Google Cloud Messaging. In such embodiments, online resource 106 may handle the delivery of messages and notifications related to functions of the disclosed embodiments, such as image compression, notification of identified vehicles alerts, and/or completion messages and notifications.

Comparison resource 107 may include one or more servers or storage services configured to store comparison information. In some aspects, the one or more servers or storage services can host one or more resources provided by one or more service providers. Comparison information can include pricing information, vehicle-related information, and personal information. In some embodiments, comparison information can include records of vehicle financing transactions, such as vehicle financing applications submitted by other users of system 100. Pricing information can include vehicle prices, monthly payment amounts, APRs, term lengths, warranty products typically purchased (e.g., tire protection plans, extended warranties), and/or amounts financed. Vehicle-related information can include vehicle make, model, vehicle identification number, color, trim, mileage, dealership of lease or purchase, geographic area of lease or purchase (zip code, city, state, etc.), date of lease or purchase, and/or other information potentially affecting the price of a vehicle. Personal information can include demographic (e.g., age), financial (e.g., income, credit rating), residence (e.g., home address), and/or prior behavior information (e.g. driving record). In some embodiments, comparison resource 107 can be configured to store comparison information in one or more databases. The one or more databases can be configured to allow retrieval of comparison information according to one or more of pricing information, vehicle-related information, and personal information. For example, comparison resource 107 can be configured to allow another component of system 100 (e.g., system 105) to retrieve at least a subset of comparison information (e.g., pricing information) concerning a particular vehicle make, model, and trim. In some embodiments, comparison resource 107 can include information concerning customers of a financial service provider. In some aspects, the financial service provider can be associated with one or more other components of system 100, such as system 105.

Client device 190 may include one or more computing devices configured to perform operations consistent with disclosed embodiments. For example, client device 190 may include at least one of a desktop computer, a laptop, a server, a mobile device (e.g., tablet, smart phone, etc.), a gaming device, a wearable computing device, or other type of computing device. Client device 190 may include one or more processors configured to execute software instructions stored in memory, such as memory included in client device 190. Client device 190 may include software that when executed by a processor performs Internet-related communication and content display processes. For instance, client device 190 may execute browser software that generates and displays interfaces including content on a display device included in, or connected to, client device 190. Client device 190 may execute applications that allow client device 190 to communicate with components over network 170, and generate and display content in interfaces via a display device included in client device 190. The display device may be configured to display images described in FIG. 9. The disclosed embodiments are not limited to any particular configuration of client device 190. For instance, client device 190 can be a mobile device that stores and executes mobile applications that interact with server system 105 and/or online resource 106 to perform aspects of the disclosed embodiments, such as providing information about vehicles in database 180. In certain embodiments, client device 190 may be configured to execute software instructions relating to location services, such as GPS locations. For example, client device 190 may be configured to determine a geographic location and provide location data and time stamp data corresponding to the location data. In yet other embodiments, client device 190 may capture video and/or images.

Database 180 may include one or more computing devices configured to provide vehicle data to one or more of server system 105, model generator 120, and image classifier 130. In some aspects, such vehicle data can include vehicle inventory listings, vehicle images, vehicle features, and stored information about vehicle sales like cost or condition. Database 180 may include, for example, one or more Oracle™ databases, Sybase™ databases, or other relational databases or non-relational databases, such as Hadoop™ sequence files, HBase™, or Cassandra™ Database(s) 180 may include computing components (e.g., database management system, database server, etc.) configured to receive and process requests for data stored in memory devices of the database(s) and to provide data from the database(s).

While database 180 is shown separately, in some embodiments database 180 may be included in or otherwise related to one or more of server system 105, image recognizer 110, model generator 120, image classifier 130, and online resource 106.

Database 180 may be configured to collect and/or maintain vehicle data for vehicles displayed using online resource 106. Database 180 can be configured to provide such data to the server system 105, model generator 120, image classifier 130, and client device 190. Database 180 may collect this data from a variety of sources, including, for instance, online resource 106. Database 180 is further described below in connection with FIG. 3.

Image classifier 130 may include one or more computing systems configured to collect and process images. Image classifier 130 may be configured to use the processed images to create training data sets. Consistent with disclosed embodiments, these training data sets can be used to develop an identification model. For example, image classifier 130 may include an image collector that collects images for use in training a linear regression classifier or a convolutional neural network. In some embodiments, image classifier 130 can be configured to communicate with online resource 106 and to detect changes in online resource 106. In some embodiments, detection of such changes can cause image classifier 130 to collect images and begin the classification process.

Model generator 120 may include one or more computing systems configured to generate models to identify a vehicle using a vehicle image. Model generator 120 may be configured to receive or obtain information from database 180, online resource 106, and/or image classifier 130. For example, model generator 120 may receive a plurality of images from database 180 and online resource 106. As and additional example, model generator 120 may also receive images and metadata from image classifier 130.

In some embodiments, model generator 120 may receive requests from image recognizer 110. As a response to such a request, model generator 120 may generate one or more identification models. In some aspects, identification models may include convolutional neural networks that determine attributes in an image based on features extracted from the image. In various aspects, identification models may include statistical algorithms. After training with a set of training images, these statistical algorithms can determine a similarity between images. For example, identification models may include regression models that estimate the relationships among input and output variables. In some aspects, identification models may additionally sort elements of a dataset using one or more classifiers to determine the probability of a specific outcome. Statistical identification models may be parametric, non-parametric, and/or semi-parametric models. A convolutional neural network model can be configured to process an image into a collection of features. The convolutional neural network can comprise an input layer, one or more middle layers, and one or more output layers. An image can be applied to the input layer. In some embodiments, the input layer can comprise multiple matrices (e.g., a matrix for each of the red, green, and blue pixel values in an RGB image). In some embodiments, the input layer can comprise a single matrix (e.g., a single two-dimensional matrix of pixel brightness values). In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. Each spatial filter function can be defined by a matrix of weights to be applied to each element of the preceding layer during a convolution operation, an offset, and an activation function. Training the convolutional neural network can comprise modifying the weights and offsets using a backpropagation algorithm. In some embodiments, the convolutional neural network can also include pooling layers and fully connected layers according to methods known in the art. Identification models may also include Random Forests, composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include classification and regression trees, or other types of models known to those skilled in the art.

Model generator 120 may be configured to submit models to identify a vehicle. To generate identification models, model generator 120 may analyze images that are classified by the image classifier 130, applying machine learning methods. Model generator 120 may communicate with server system 105 via network 170 or other communication avenues.

Image recognizer 110 may be configured to identify vehicles based on images of vehicles. In some embodiments, Image recognizer 110 may receive a request to identify a vehicle in an image. Image recognizer 110 may receive the request directly from client device 190. Alternatively, image recognizer 110 may receive the request from other components of system 100. For example, client device 190 may send requests to online resource 106, which then sends requests to server system 105. The request may include an image of a vehicle and a location of client device 190. In other embodiments, the request may include a video file or a streaming video feed.

As a response to identification requests, server system 105 may request identification models from model generator 120. The request may include information about the image source, for example an identification of client device 190. The request may additionally specify a location. In addition, image recognizer 110 may retrieve information from database 180.

Image recognizer 110 may generate an identification result based on the information received from the client request and transmit the information to the client device. Image recognizer 110 may generate instructions to modify a graphical user interface to include identification information associated with the received image.

FIG. 1 shows image recognizer 110, model generator 120, and image classifier 130 as different components. However, image recognizer 110, model generator 120, and image classifier 130 may be implemented in the same computing system.

Location determination system 140 may include one or more computing systems configured to perform operations consistent with determining a location of a client device 190. In some embodiments, location determination system 140 may transmit a request to client device 190 for location information. In response to the request, client device 190 may transmit location information such as geographic coordinates or identifiers to the location determination system 140 via network 170. The location determination system 140 may map the geographic coordinates or identifiers to a specific geographic location. The location determination system 140 may include satellite based geolocation systems, e.g., GPS, Glonass, Galileo, etc.; long range terrestrial geolocation systems, e.g., LORAN; short-range network based geolocation systems, e.g., network based cellular e911; short range proximity location sensing, e.g., 802.11 access point identification, line-of-sight location identification, e.g., IRdA or other visible, sonic or invisible electromagnetic waves which are confined by barriers; RFID based location detectors; and the like.

Authentication module 150 may include one or more computing systems configured to perform one or more operations consistent with authenticating a user. In some embodiments, a user registers for an account and creates a user name and password. The user account information, including the user name and password, may be stored in memory 160, for example. To access the user account, a registered user can provide the user name and password information to the authentication module 150 via client device 190. Authentication module 150 can be configured to authenticate the user based on the received user name and password information. Authentication module 150 can then grant access to the user account. In some embodiments, user account information includes pre-qualified financing application information, as discussed further below.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 170. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
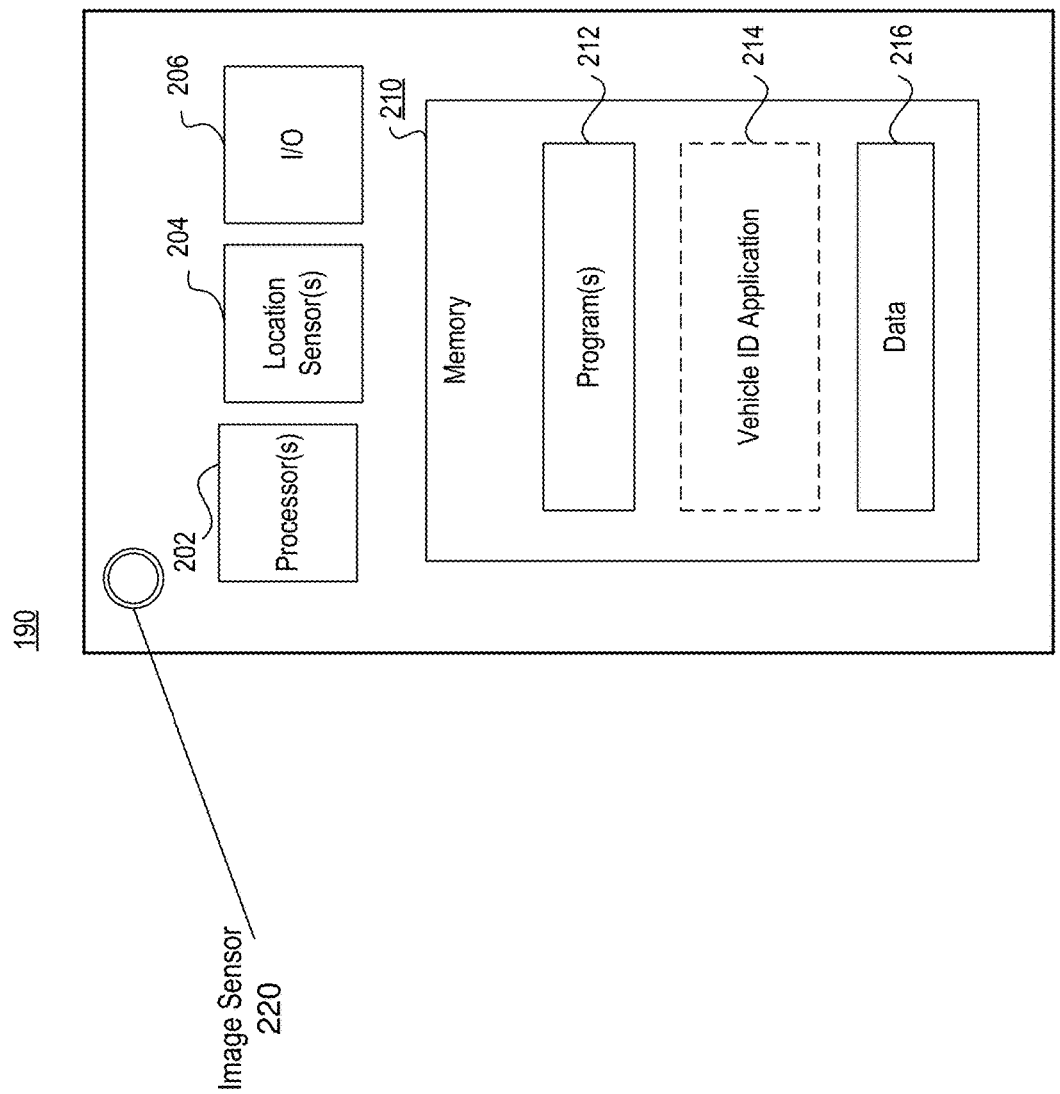
FIG. 2 is a block diagram of an exemplary client device, in accordance with disclosed embodiments.

FIG. 2 is a block diagram of client device 190, in accordance with disclosed embodiments. In one embodiment, client device 190 may include processor 202, location sensor 204, input/output (I/O) system 206, and memory 210. In some embodiments, client device 190 may take the form of a mobile computing device (e.g., a wearable device, smartphone, tablets, laptop, or similar device), a desktop (or workstation or similar device), or a server. Alternatively, client device 190 may be configured as a particular apparatus, embedded system, dedicated circuit, and the like based on the storage, execution, and/or implementation of the software instructions that perform one or more operations consistent with the disclosed embodiments. According to some embodiments, client device 190 may be configured to provide a web browser or similar computing application capable of accessing web sites, consistent with disclosed embodiments.

Processor 202 may include one or more known processing devices, such as mobile device microprocessors manufactured by Intel™, NVIDIA™, or various processors from other manufacturers. As would be appreciated by one of skill in the art, the disclosed embodiments are not limited to a particular processor type.

Memory 210 may include one or more storage devices configured to store instructions for performing operations related to disclosed embodiments. For example, memory 210 may be configured with one or more software instructions, such as program 212, that when executed by processor 202, can cause client device 190 to perform operations according to the disclosed embodiments. The disclosed embodiments are not limited to separate programs or computers configured to perform dedicated tasks. For example, client device 190 can be configured to perform the disclosed functions of client device 190 by one or more programs stored in memory 210 (e.g., program 212). In some aspects, memory 210 can be configured to store data 216 used by one or more programs 212.

In certain embodiments, memory 210 may store a vehicle identification application 214 that may be executed by processor(s) 202 to perform one or more identification processes consistent with disclosed embodiments. In certain aspects, vehicle identification application 214, or another software component, may be configured to request identification from server system 105 or determine the location of client device 190.

Location sensor 204 may include sensor(s) and/or system(s) capable of determining a location of client device 190, such as a Global Positioning System (GPS) receiver, Bluetooth transceiver, or WiFi transceiver. When location sensor 204 includes multiple sensor(s) and/or system(s), client device 190 can be configured to determine geographic coordinates or identifiers, such as latitude or longitude based on data provided from multiple sensor(s) and/or system(s). Client device 190 can be configured to send the geographic coordinates or identifiers determined by location sensor 204 to other components of system 100 via, for example, network 170.

I/O system 206 may include one or more devices configured to allow data to be received and/or transmitted by client device 190 and to allow client device 190 to communicate with other machines and devices, such as other components of system 100. For example, I/O system 206 may include a screen for providing information to the user. I/O system 206 may also include components for NFC communication. I/O system 206 may also include one or more digital and/or analog devices that allow a user to interact with client device 190 such as a touch-sensitive area, buttons, or microphones. I/O system 206 may also include one or more accelerometers to detect the orientation and inertia of client device 190. I/O system 206 may also include other components known in the art for interacting with server system 105.

In some embodiments, client device 190 may include image sensor 220 (e.g., a digital camera). Image sensor 220 can be configured to take images or video and send it to other component of system 100 via, for example, network 170.

The components of client device 190 may be implemented in hardware, software, or a combination of both hardware and software, as will be apparent to those skilled in the art.

Figure 3:
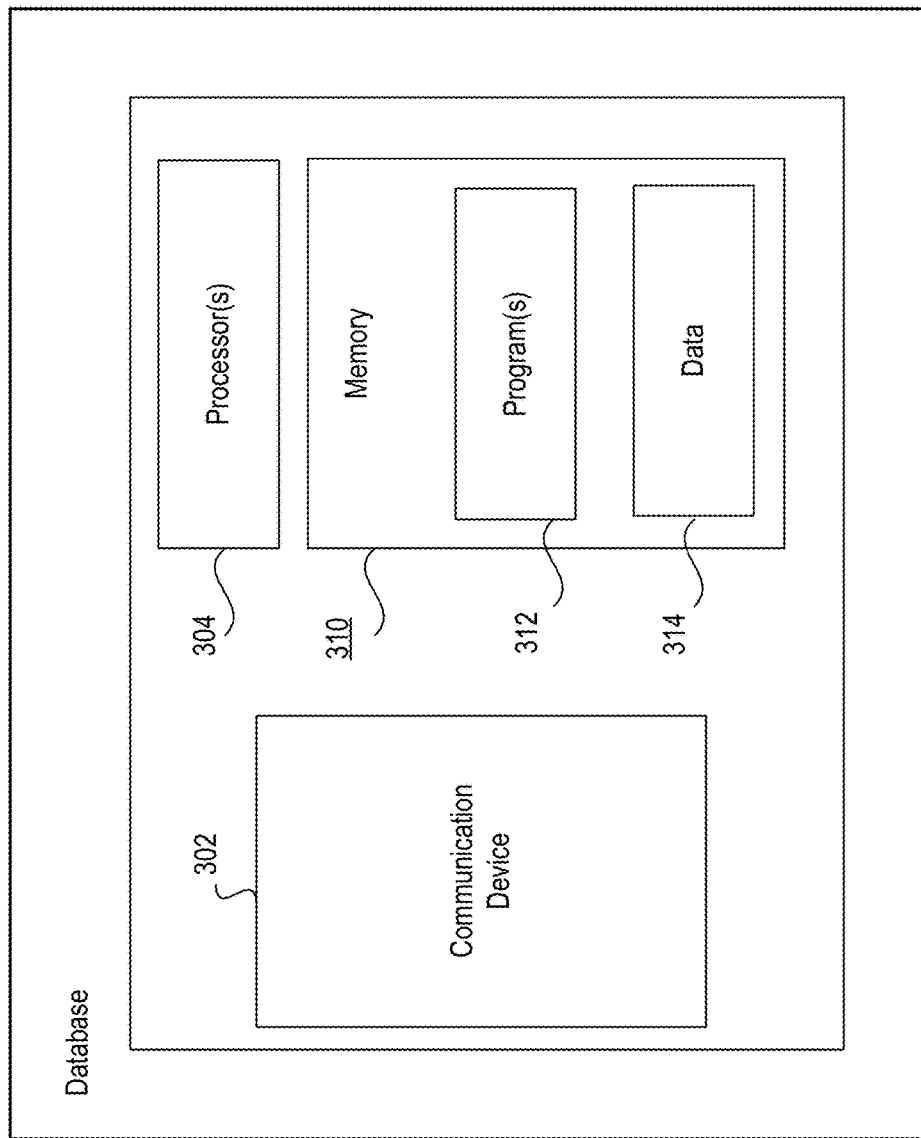
FIG. 3 is a block diagram of an exemplary database, in accordance with disclosed embodiments.

FIG. 3 is a block diagram of an exemplary database 180, in accordance with disclosed embodiments. Database 180 may include a communication device 302, one or more database processors 304, and database memory 310 including one or more database programs 312 and data 314. In some embodiments, database 180 may be hosted on one or more computing devices (e.g., desktops, workstations, servers, and computing clusters).

Communication device 302 may be configured to communicate with one or more components of system 100, such as online resource 106, comparison resource 107, server system 105, model generator 120, image classifier 130, and/or client device 190. In particular, communication device 302 may be configured to provide to model generator 120 and image classifier 130 images of vehicles that may be used to generate a convolutional neural network or an identification model.

The components of database 180 may be implemented in hardware, software, or a combination of both hardware and software, as will be apparent to those skilled in the art. For example, although one or more components of database 180 may be implemented as computer processing instruction modules, all or a portion of the functionality of database 180 may be implemented instead in dedicated electronics hardware.

Data 314 may be data associated with websites, such as online resource 106. Data 314 may include, for example, information from websites of vehicle dealers or vehicle manufacturers. Data 314 may include images of vehicles and information of vehicles, such as cost, condition, and dealers offering the vehicle. Data 314 may include vehicle inventory information for a particular vehicle dealership. Data 314 may include a map of a dealership lot and include specific location information for each vehicle in the dealership based on the map.

Figure 4:
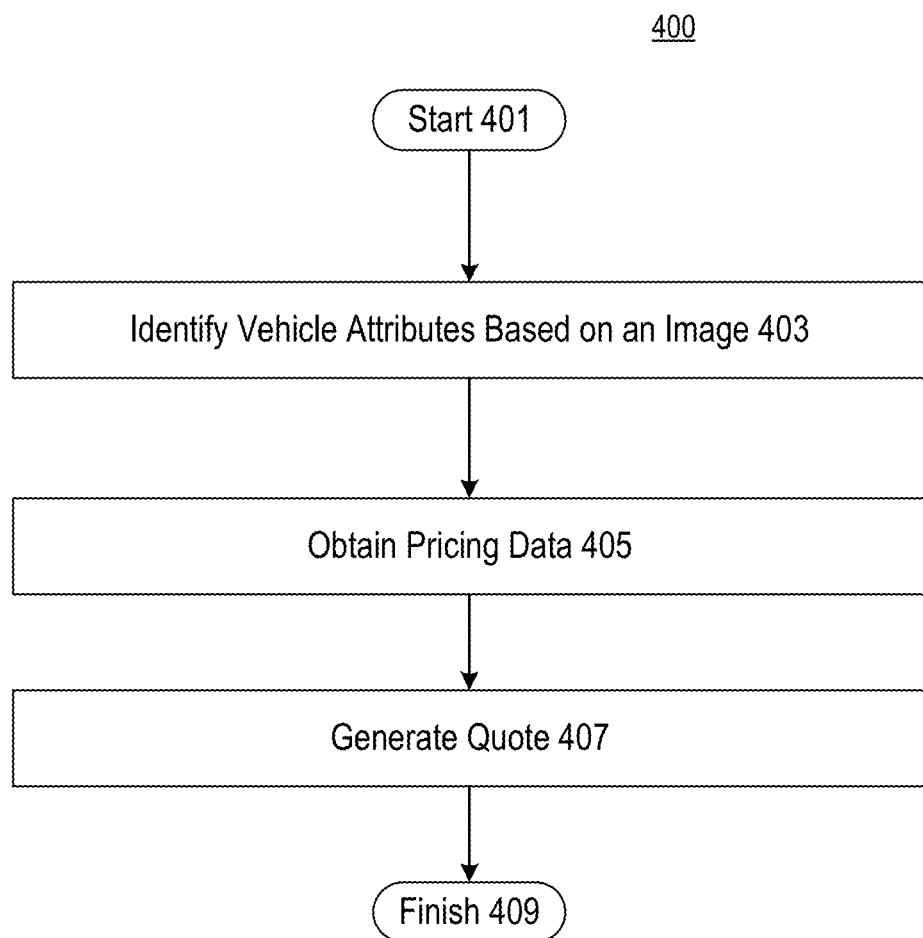
FIG. 4 is a flowchart of an exemplary method for generating a real-time quote for a vehicle, consistent with embodiments of the present disclosure.

FIG. 4 is a flowchart of an exemplary method 400 for generating a real-time quote for a vehicle, consistent with embodiments of the present disclosure. Method 400 can include the steps of identifying vehicle attributes based on an image, obtaining pricing data, and generating a quote. Method 400 can be performed using system 100. In some embodiments, one or more steps of method 400 can be performed by client device 190. In various embodiments, one or more steps of method 400 can be performed by system 105. In certain embodiments, method 400 can be performed entirely by system 105 (or by client device 190).

After starting in step 401, system 100 can identify vehicle attributes based on an image in step 403. In some embodiments, identification of vehicle attributes can be performed using system 105. For example, system 105 can be configured to use image recognizer 110 to identify vehicle attributes. In some aspects, image recognizer 110 can be configured to use a model generated by model generator 120. In some aspects, system 105 can be configured to receive the image from client device 190. In various embodiments, identification of vehicle attributes can be performed using client device 190. For example, client device 190 can be configured to receive a model generated by model generator 120. In various aspects, client device 190 can be configured to obtain an image (e.g., using image sensor 220). Client device 190 can be configured to apply this image to the model to identify vehicle attributes.

After step 403, system 100 can obtain pricing data in step 405. In some embodiments, the pricing data can be obtained using system 105. For example, system 105 can be configured to obtain pricing data from one or more of database 180, online resource 106, or comparison resource 107. As an additional example, system 105 can be configured to obtain data 314 from database 180. As a further example, system 105 can be configured to obtain from comparison resource 107 at least one of pricing information, vehicle-related information, and personal information. As an additional example, system 105 can be configured to obtain from online resource 106 at least one of information retrieved from the website of a vehicle manufacturers and/or vehicle dealer. In some aspects, system 105 can be configured to receive information concerning a user from client device 190. In various embodiments, the pricing data can be obtained using client device 190. For example, client device 190 can be configured to interact with at least one of a user, database 180, online resource 106, or comparison resource 107 to obtain the pricing data.

After step 405, system 100 can be configured to generate a quote in step 407. The quote can depend on the pricing data gathered in step 405. For example, the quote can include at least one of a vehicle price, monthly payment amount, APR, term length, or amount financed based on the pricing data. In some embodiments, the quote can be generated by system 105. In various embodiments, the quote can be generated by client device 190. After step 407, method 400 can end at step 409.

Figure 5:
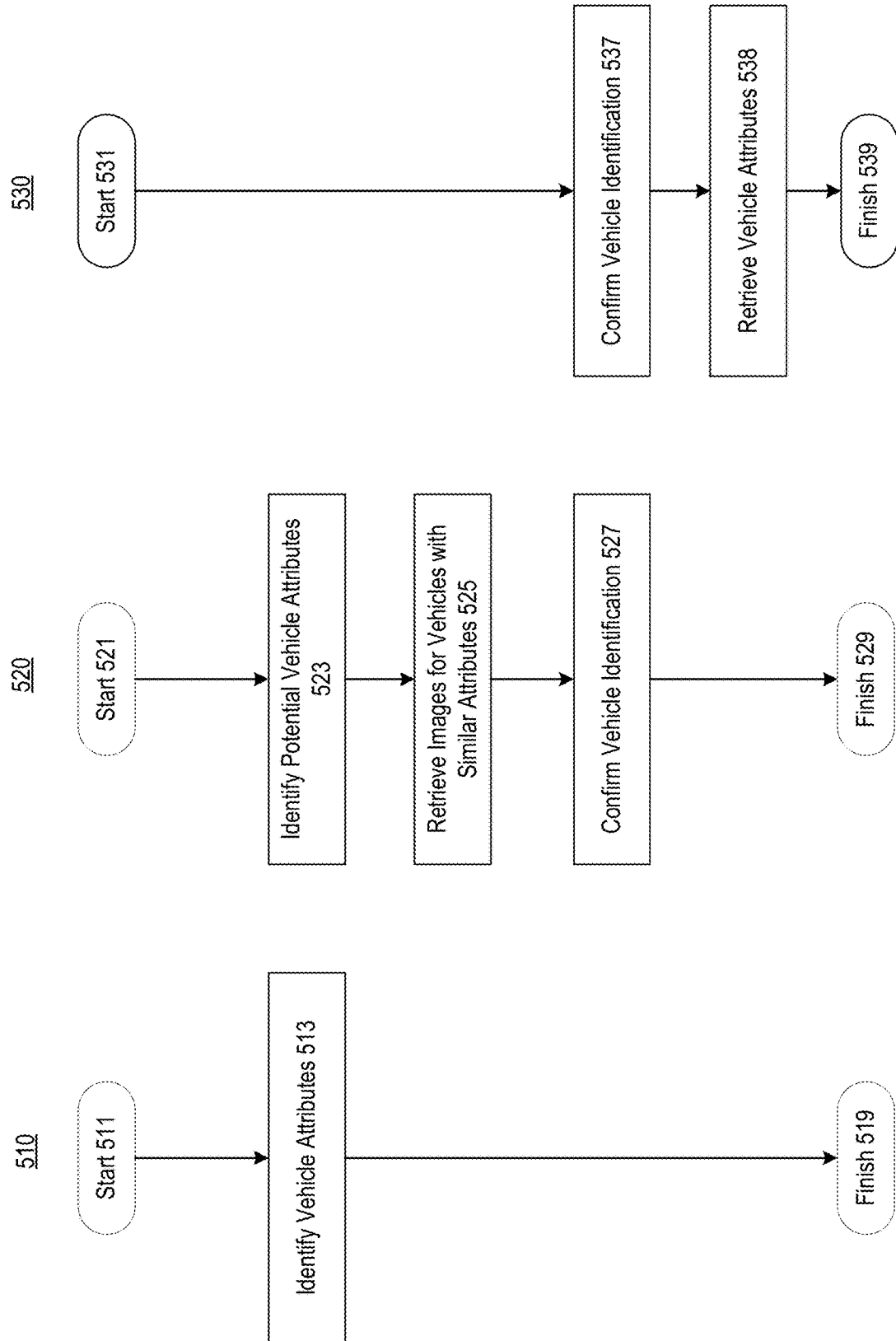
FIGS. 5A-5C are flowcharts of exemplary methods for identifying vehicle attributes based on an image, consistent with embodiments of the present disclosure.

FIGS. 5A-5C are flowcharts of exemplary methods for identifying vehicle attributes based on an image, consistent with embodiments of the present disclosure. In some embodiments, system 100 can use the exemplary methods depicted in FIGS. 5A-5C to identify vehicle attributes based on an original image in step 403 of method 400.

According to method 510, after starting in step 511, system 100 can be configured to identify vehicle attributes from an original image in step 513. In some aspects, system 105 can be configured to identify the vehicle attributes. In various aspects, client device 190 can be configured to identify the vehicle attributes. The vehicle attributes can be identified from an image obtained by client device 190. The vehicle attributes can be identified using a model generated by model generator 120. After step 513, method 510 can end at step 519.

According to method 520, after starting in step 521, system 100 can be configured to identify potential vehicle attributes from an original image in step 523. The identification of potential vehicle attributes in step 523 may proceed similarly to the identification of vehicle attributes in step 513. After step 523, system 100 can retrieve vehicle images in step 525. In some aspects, the vehicle images can be retrieved from a database associated with one or more dealerships and/or vehicle manufacturers (e.g., database 180). In some aspects, this database can include records associating images with vehicle attributes. For example, a record can include one or more images of a vehicle and one or more vehicle attributes for that vehicle. As an additional example, a record could include images of a Chevy Bolt and the vehicle attributes "Chevy" and "Bolt". In some embodiments, system 100 can be configured to create the records by extracting the vehicle attributes from the one or more images. In various aspects, the vehicle images can be retrieved using one or more of the vehicle attributes identified in step 523. For example, images of vehicles with one or more attributes similar to those vehicle attributes identified in step 523 can be retrieved. As an additional example, when the vehicle attributes "Chevy" and "Bolt" are extracted from the original image in step 523, the record describe above could be identified, and the associated images of the Chevy Bolt retrieved. In various embodiments, images can be retrieved in this manner by client device 190 or system 105. After step 525, system 100 can be configured to confirm the vehicle identification in step 527.

In some embodiments, system 100 can be configured to compare the original image to the retrieved image. In certain aspects, the comparison can be performed by client device 190 or system 105. The comparison can be performed using machine learning features extracted from the original image and the images retrieved from the database. System 100 can be configured to determine that the original image and the one or more retrieved images are similar when the comparison satisfies a matching criterion. In some aspects, system 100 can identify vehicle attributes of the original image based on the potential vehicle attributes identified in step 523 and the vehicle attributes associated with the one or more retrieved images. For example, system 100 can be configured to select the potential vehicle attributes as the actual vehicle attributes when they match the vehicle attributes associated with the one or more retrieved images. As an additional example, system 100 can be configured to select the vehicle attributes associated with the one or more retrieved images as the actual vehicle attributes. For example, the vehicle image can be retrieved by make and model, and the value for trim and year can be selected from the vehicle attributes associated with the one or more retrieved images. In this manner, the potential vehicle attributes can be used to retrieve a limited number of images from the database, reducing the number of required image comparisons to determine the actual vehicle attributes. After step 527, method 520 can end at step 529.

According to method 530, after starting in step 531, system 100 can be configured to confirm a vehicle identification in step 537. In some embodiments, system 100 can be configured to compare an original image to the images in a database (e.g., database 180). In certain aspects, the comparison can be performed by client device 190 or system 105. The comparison can be performed using machine learning features extracted from the original image and the images in the database. System 100 can be configured to determine that the original image and the one or more retrieved images are similar when the comparison satisfies a matching criterion. After identifying similar images in step 537, system 100 can be configured to retrieve vehicle attributes associated with the matched images in step 538. For example, the database can be configured to store images of vehicles associated with attributes of the depicted vehicles. System 100 can match the original image to images in the database. The vehicle attributes for the original image can then be retrieved from the database based on the matching image(s). In some aspects, comparing all images in the database to the original image may be practicable. After step 538, method 530 can end at step 539.

Figure 6:
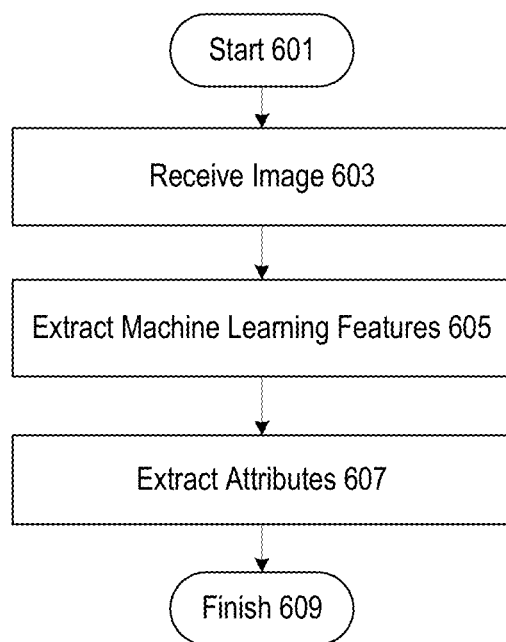
FIG. 6 is a flowchart of an exemplary method for identifying vehicle attributes using two convolutional neural networks, consistent with embodiments of the present disclosure.

FIG. 6 is a flowchart of an exemplary method 600 for identifying vehicle attributes (as described above with regards to FIGS. 5A and 5B) using two convolutional neural networks, consistent with embodiments of the present disclosure. After starting in step 601, a component of system 100 (e.g., client device 190 or system 105) can receive an image in step 603. In some embodiments, the image can be obtained using an image sensor 220. In various embodiments the image can be retrieved from a database (e.g. database 180). In step 605, a component of system 100 (e.g., client device 190 or system 105) can extract machine learning features from the retrieved image. In some embodiments, these features can be extracted by inputting the image, or a version of the image, into a first convolutional neural network. The first convolutional neural network can be configured to output the machine learning features. In step 607, a component of system 100 (e.g., client device 190 or system 105) can extract vehicle attributes from the machine learning features. In some embodiments, these features can be extracted by inputting the machine learning features into a second convolutional neural network. In some embodiments, the second convolutional neural network can be distinct from the first convolutional neural network. The second convolutional neural network can be configured to output indications of the vehicle attributes. After step 607, method 600 can end at step 609.

Figure 7:
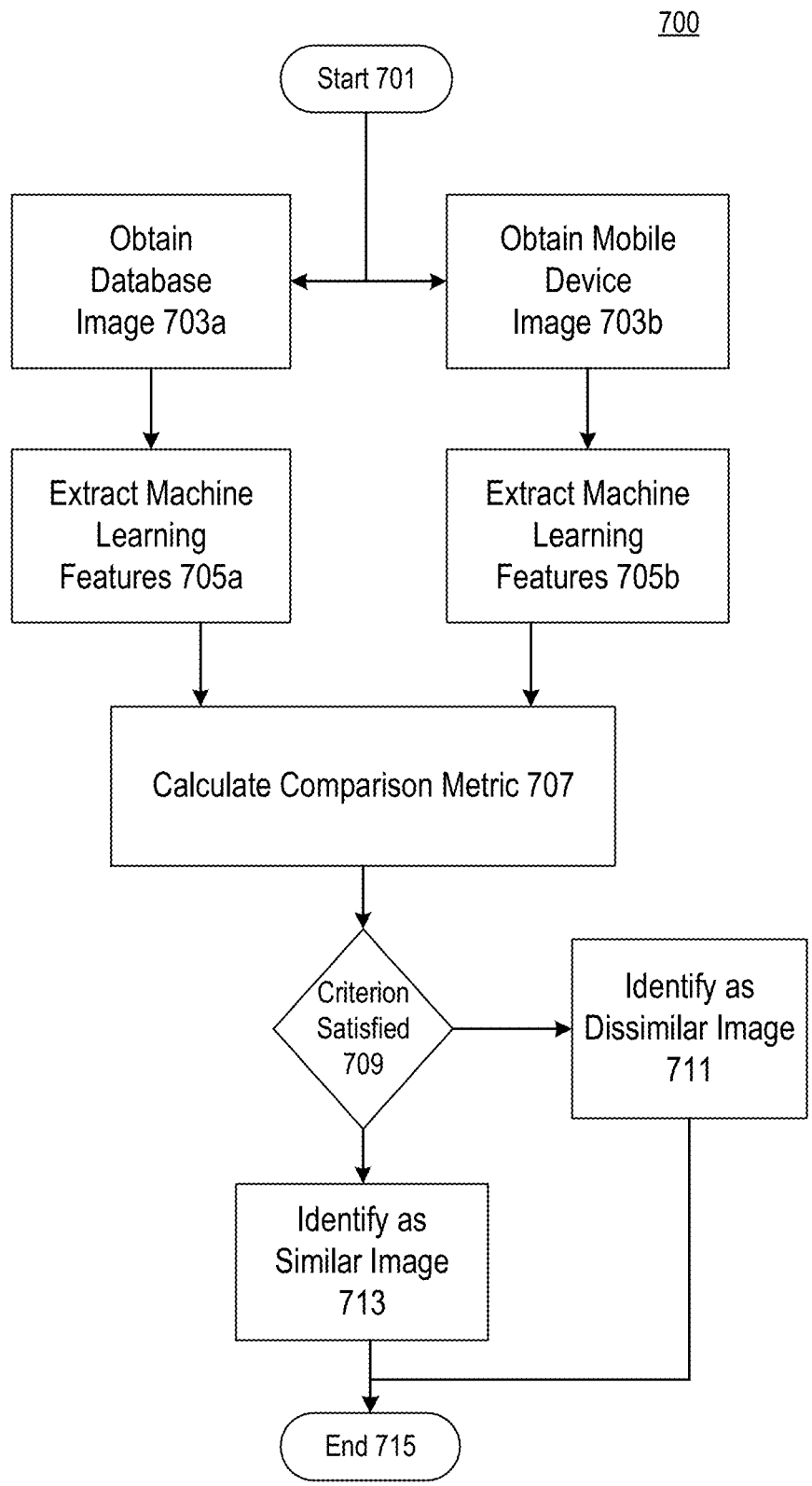
FIG. 7 is a flowchart of an exemplary method for comparing images using a convolutional neural network, consistent with embodiments of the present disclosure.

FIG. 7 is a flowchart of an exemplary method 700 for comparing images using a convolutional neural network (as described above with regards to FIGS. 5B and 5C), consistent with embodiments of the present disclosure. As shown in FIG. 7, system 100 can extract features from a database image and a mobile device image, compare these features, and determine whether the images are similar.

After starting in step 701, a component of system 100 (e.g., client device 190 or system 105) can obtain an image from a database (e.g., database 180) in step 703a. For example, client device 190 or system 105 can be configured to communicate with database 180 to retrieve an image. After step 703a, a component of system 100 (e.g., client device 190 or system 105) can extract machine learning features from the image using a convolutional neural network in step 705a. Similarly, after starting in step 701, a component of system 100 (e.g., client device 190 or system 105) can obtain an image from a mobile device (e.g., using image sensor 220 of client device 190) in step 703b. For example, system 105 can be configured to communicate with client device 190 to retrieve an image captures by image sensor 220. After step 703a, a component of system 100 (e.g., client device 190 or system 105) can extract machine learning features from the image using a convolutional neural network in step 705a. Likewise, after step 703b, a component of system 100 (e.g., client device 190 or system 105) can extract machine learning features from the mobile image using a convolutional neural network in step 705b. In some aspects, system 100 can be configured to extract machine learning features from the database image and the mobile image using different components of system 100. For example, system 105 can extract the machine learning features of the database image, and client device 190 can extract the machine learning features of the mobile device image. After steps 705a and 705b, component of system 100 (e.g., client device 190 or system 105) can calculate a comparison metric in step 707. In some embodiments, this calculation can involve inputting the machine learning features extracted from the database image and the machine learning features extracted from the mobile device image into a classifier, such as another neural network. In additional embodiments, a component of system 100 can be configured to calculate a metric based on the extracted machine learning features (e.g., an inner product of the machine learning features extracted from the database image and the machine learning features extracted from the mobile device image). A value of the metric can indicate the degree of similarity between the images. In some instances values of the metric can increase with increasing similarity. In various instances values of the metric can decrease with increasing similarity. After step 707, a component of system 100 (e.g., client device 190 or system 105) can determine whether the calculated comparison metric satisfies a matching criterion. For example, when the metric increases with increasing similarity, the matching criterion can be satisfied when a value of the metric exceeds a threshold value. After step 709, a component of system 100 (e.g., client device 190 or system 105) can identify the image as either a similar image (step 713) or a dissimilar image (711). System 100 can be configured to rely upon this determination when confirming identification of a vehicle (e.g., in step 527 of method 520 or in step 537 of method 530). After step 711 or step 713, method 700 can end at step 715.

Figure 8:
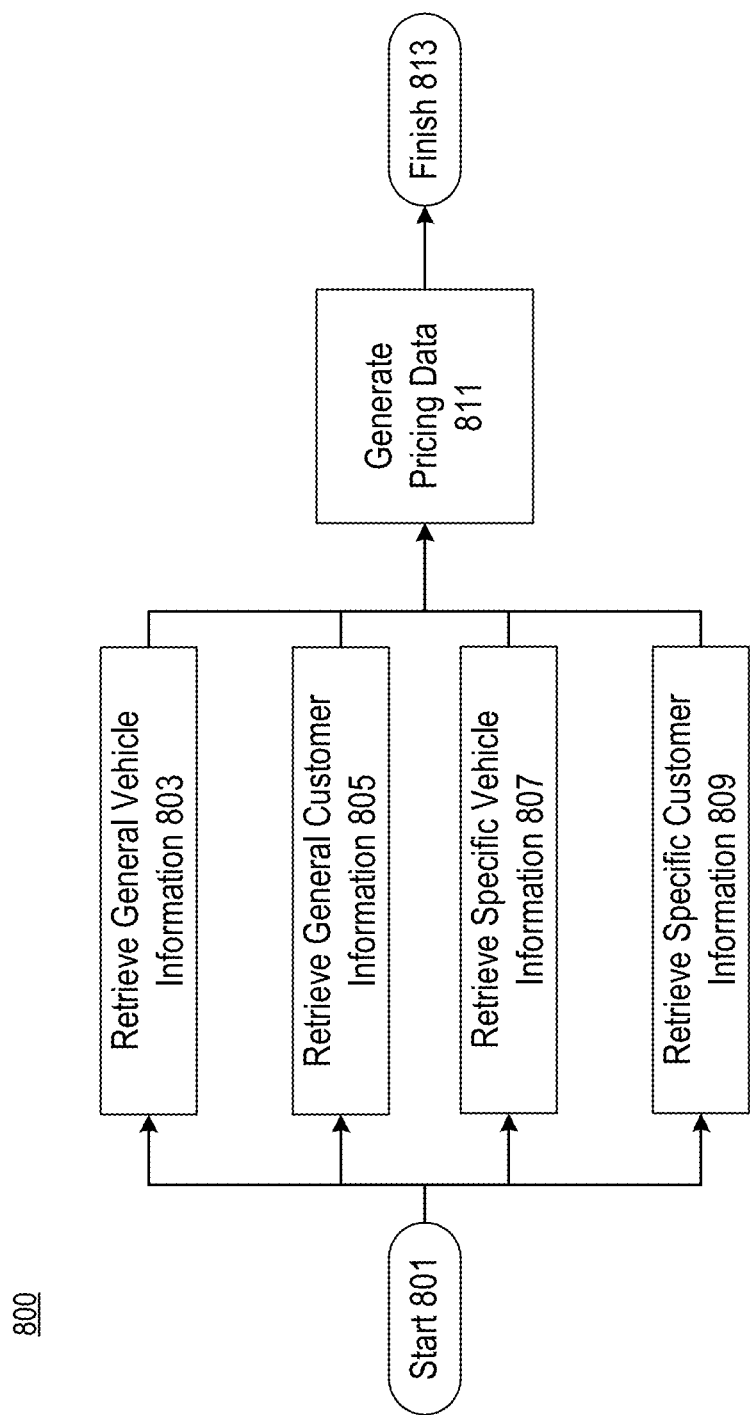
FIG. 8 is a flowchart of an exemplary method for generating pricing information, consistent with embodiments of the present disclosure.

FIG. 8 is a flowchart depicting a method 800 for generating pricing data, consistent with embodiments of the present disclosure. In some embodiments, system 100 can use method 800 in step 405 of method 400. After starting in step 801, a component of system 100 (e.g., client device 190 or system 105) can retrieve information from at least one of the following categories: general vehicle information, general customer information, specific vehicle information, and specific customer information. General vehicle information 803 can include general pricing information (e.g., MSRP, invoice price, rebates). For some vehicles, general vehicle information 803 may be the only information available. In some embodiments, general vehicle information 803 can be retrieved from at least one of database 180, online resource 106, or comparison resource 107. General customer information 805 can include the financing terms received by other users for the identified vehicle (within a certain period of time, in a certain geographic area, for users having certain characteristics, etc.). In some embodiments, general customer information 805 can be retrieved from comparison resource 107. Specific vehicle information 807 can include the price and available rebate information for a particular car (e.g. when the image concerns a particular car at a dealership). In some embodiments, specific vehicle information 807 can be retrieved from at least one of database 180 or online resource 106. Specific customer information 809 can include prequalification information for a particular user (credit rating, income, etc.). In some embodiments, specific customer information 809 can be retrieved from at least one of system 105 or client device 190. For example, a customer can interact with system 105 (or client device 190) to prequalify for vehicle financing, and specific customer information can be received and stored by system 105 (or client device 190) during that prequalification. As an additional example, a customer can interact with client device 190 after providing an image of a vehicle. In this example, the customer can provide specific customer information to enable system 100 to generate a personalized quote for the vehicle in the image. After retrieving data in one or more of steps 803, 805, 807, and 809, system 100 can generate pricing data in step 811. Generating the pricing data can include storing the retrieved data on at least one of system 105 and client device 190. In some aspects, generating the pricing data can include organizing the retrieved data according to a common schema (e.g., a common record layout with common datatypes and formats, regardless of the origin of the retrieved data). After step 811, method 800 can finish at step 813. In this manner, a component of system 100 can be configured to generate pricing data using one or more of database 180, system 105, comparison resource 107 and online resource 106. In some embodiments, system 100 can be configured to indicate that a quote is a personalized quote when the quote is generating using specific vehicle information and specific customer information. System 100 can be configured to indicate otherwise that the quote is an estimate.

Figure 9:
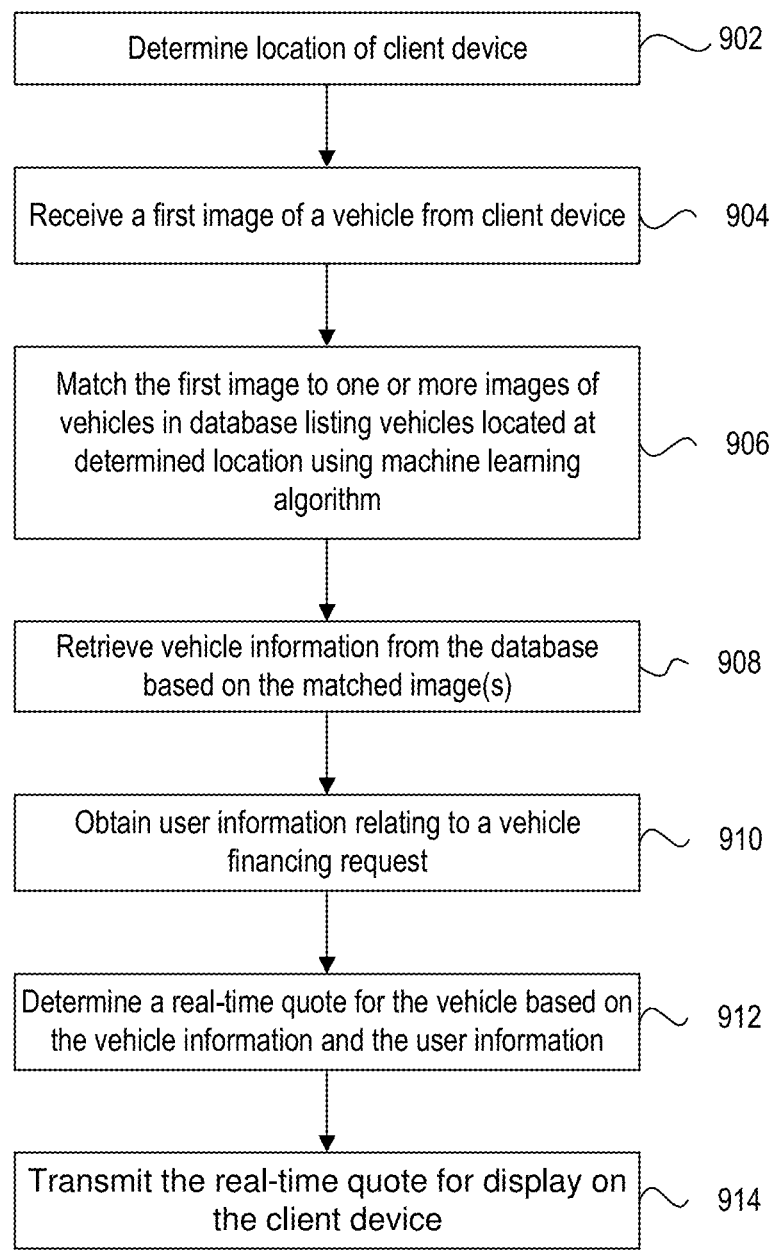
FIG. 9 is a flowchart of an exemplary method for generating a real-time quote for a vehicle, consistent with embodiments of the present disclosure.

FIG. 9 is a flowchart of an exemplary method 900 for generating a real-time quote for a vehicle, according to disclosed embodiments. In some embodiments, method 900 may be carried out by one or more components of system 100 (e.g., system 105 and/or client device 190). In some aspects, method 900 can proceed similarly to the methods described above with regards to FIGS. 4, 5B and 5C.

In step 902, a component of system 100 (e.g., system 105 or client device 190) can determine a location of a user's client device. For example, client device 190 can obtain a location from location sensor 204. As an additional example, location determination system 140 may initiate a request for a location of client device 190. Client device 190 may transmit location information, such as longitude, latitude, or other geographic identifiers, to the location determination system 140 in response to the request. The location information may be obtained using location sensor 204 in client device 190. In some embodiments, system 105 can determine that location services on client device 190 is not enabled. The system may then transmit information for display on client device 190 requesting location services be enabled. Once the location services transmits location information, location determination system 140 may determine a specific geographic location of client device 190 based on the transmitted location information.

In step 904, a component of system 100 (e.g., system 105 or client device 190) can receive a first image of a vehicle from an image sensor of client device 190. For example, system 105 may send instructions for taking a picture of a vehicle to a user interface displayed on client device 190. In some embodiments, the user may be instructed to take a picture of a vehicle using an image sensor 220, such as a camera, of the client device 190. The user interface may include instructions guiding the user to take the image of the vehicle, as described in further detail below in relation to FIG. 14. The image may then be transmitted to image recognizer 110 through network 170.

In step 906, a component of system 100 (e.g., system 105 or client device 190) can match the first image to one or more images of vehicles in a database to identify the vehicle. In some aspects, the database (e.g., database 180) can include records for vehicles located at the determined location. For example, the database can contain vehicle inventory information for a particular vehicle dealership located at the determined location. In some embodiments, the vehicle inventory information can include a listing of every vehicle available at the dealership and related information. For example, related information may include a vehicle make, model, vehicle identification number, color, trim, mileage, and/or other identifying information of a vehicle. Related information may also include images of the exterior and/or interior of the vehicle. In some embodiments, related information can include the specific location of the vehicle in the dealership based on a map of the dealership lot. In some embodiments, system 105 can be configured to retrieve related information in step 404. In various embodiments, such related information can be retrieved in step 408.

In some embodiments, as described above with regards to FIG. 5B, system 100 can, in step 906, extract attributes from the first image and match the first image to a subset of images in the database based on the extracted attributes. In various embodiments, as described above with regards to FIG. 5C, system 100 can, in step 906, match the first image to the images in the database.

In some embodiments, system 100 can provide instructions to display on client device 190 a request for confirmation that the user is at the identified location, such as the particular vehicle dealership. After receiving confirmation from the user via the client device, the component of system 100 (e.g., system 105 or client device 190) can access database 180 to retrieve one or more images of vehicles in the database.

In some embodiments, image recognizer 110 (or client device 190) can use a machine learning algorithm to match the first image to the one or more images in the database (e.g., database 180). In some aspects, the machine learning algorithm may be a convolutional neural network, as disclosed above. In some embodiments, as described above with regards to FIGS. 5B and 5C, system 105 may retrieve vehicle information from the database in step 908 once the vehicle is identified. For example, the first image may be matched to an image of a vehicle listed in the vehicle inventory of the dealership (e.g., as described above with regard to FIG. 7). Once the system determines a match, the related vehicle information can be retrieved from the database. As used herein, a "match" may include a similarity between the images that is greater than a predefined threshold. As described above, in some embodiments, the vehicle information for the dealership can be retrieved at step 906. In such embodiments, the relevant vehicle information can be selected at step 908 from the previously retrieved vehicle information.

In some embodiments, image recognizer 110 (or client device 190) can verify that the match relates to the correct vehicle. For example, image recognizer 110 can determine a match between the first image and one or more images relating to one or more vehicles listed in the database (e.g., database 180). In some aspects, system 105 may then transmit the one or more matched images to the user interface of client device 190. System 105 may transmit instructions for display on the client device 190, requesting confirmation from the user to verify the identified vehicle. For example, the user interface may be prompted to select an image of the correct vehicle. In some embodiments, image recognizer 110 may verify that the match relates to the correct vehicle by determining the expected location of the vehicle. For example, image recognizer 110 may obtain a map of the dealership from database 180, including the expected location of each vehicle listed in the dealership inventory on the map. Image recognizer 110 may further use geographical identification information embedded in the first image to determine a location of the imaged vehicle. For example, client device 190 may embed the first image with metadata providing geographic location information when the first image is captured. In some embodiments, image recognizer 110 may compare the expected location of the identified vehicle with the determined location of the imaged vehicle to verify that the identified vehicle is correct. In various aspects, in place of system 105, client device 190 can determine the match, provide the one or more matched images for display independent of system 105 for user confirmation, and/or verify the that the match relates to the expected vehicle location.

In step 910, system 105 can obtain user information relating to a vehicle financing request. In some embodiments, the user can create a user account and can submit an application to pre-qualify for vehicle financing. For example, the user may visit a website relating to the lender to register for a user account. The user account registration may require creating authentication information such as a username and password. Once the user account is registered, the authentication information can be used to access the account. For example, the user may be prompted to enter authentication information via a user interface on the client device 190 to access the account. In some embodiments, the application to pre-qualify for vehicle financing includes a request for user information. The user information may include the name, email address, home address, phone number, mailing address, date of birth, and/or social security number of the user. The user information may further include employment information including the name of the employer, job title, and/or annual income of the user. In some embodiments, after submitting the application to pre-qualify, the user can log into their account to provide system 105 with the required user information relating to the vehicle financing request.

In some embodiments, system 105 can transmit a vehicle financing application form for display on client device 190 to obtain the user information in step 910. The application form may include a request for user information similar to the application to pre-qualify discussed above. In some embodiments, the application form can include a shortened questionnaire to provide a prompt real-time quote. For example, the questionnaire may request information relating to the vehicle condition, the user's credit, the amount desired to finance, and/or the preferred term length. In some embodiments, the shortened questionnaire information is sufficient to provide the required user information.

In step 912, a component of system 100 (e.g., system 105 or client device 190) can determine a real-time quote for the vehicle based on the vehicle information obtained at step 908 and the user information obtained at step 910. In some embodiments, the real-time quote includes pricing information relating to the identified vehicle. For example, the pricing information may include a vehicle price, monthly payment amount, APR, term length, and/or amount financed. This real-time quote can be personalized based on the information obtained from the user in step 910 (e.g., through pre-qualification and/or a questionnaire). As a non-limiting example, the real-time quote can reflect the user's credit, the amount desired to finance, and/or the preferred term length.

In step 914, client device 190 can display the real-time quote. In some embodiments, system 105 can transmit the quote for display on client device 190. For example, the real-time quote may be transmitted via network 170 and displayed on a user interface on client device 190. In some embodiments, the user may manipulate different factors to determine how the quote is affected. For example, the user may add, remove, or make changes to a service contract, gap insurance, or down payment to determine the effect on payment options, APR, and/or monthly payments relating to the quote. In various embodiments, client 190 can generate, display, and update the real-time quote in response to user input.

Figure 10:
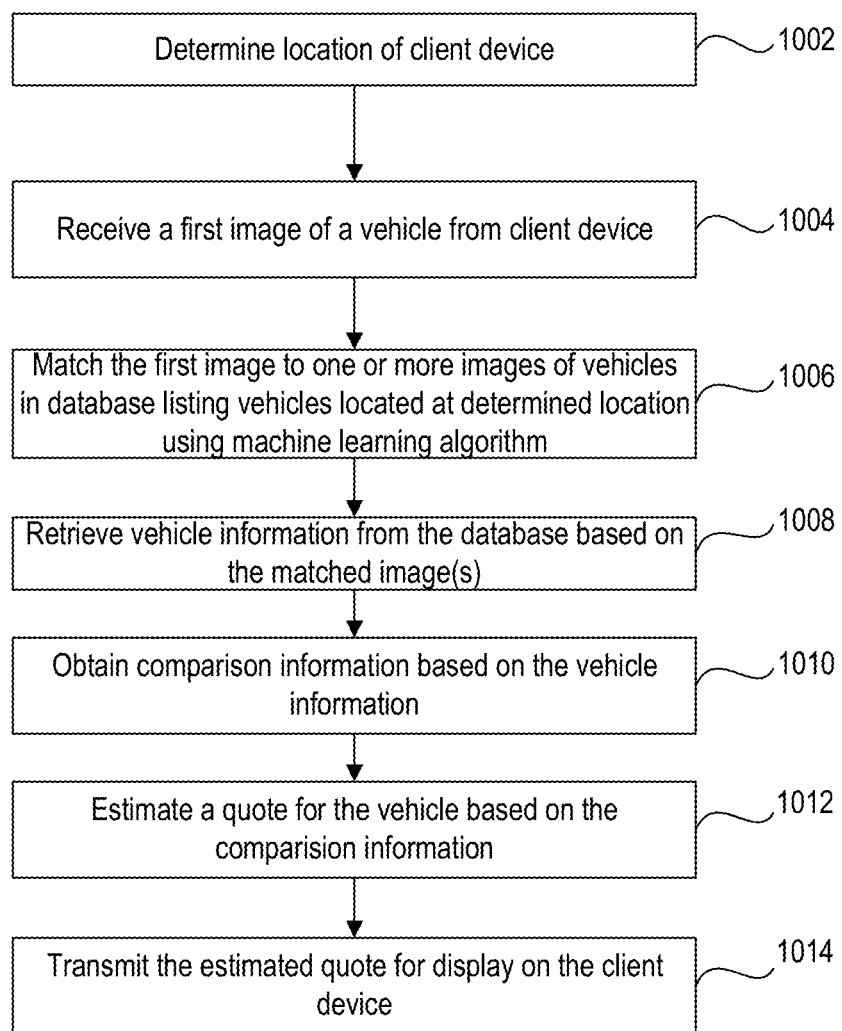
FIG. 10 is a flowchart of another exemplary method for generating a real-time quote for a vehicle, consistent with embodiments of the present disclosure.

FIG. 10 is a flowchart of an exemplary method 1000 for generating a real-time quote for a vehicle, according to disclosed embodiments. In some embodiments, method 1000 may be carried out by one or more components of system 100 (e.g., system 105 and/or client device 190). In some aspects, method 1000 can proceed similarly to the methods described above with regards to FIGS. 4, 5B, 5C, and 8.

In some embodiments, steps 1002-1010 may proceed as described above with regards to FIG. 9. For example, in step 1002, a component of system 100 (e.g., system 105 or client device 190) can determine a location of a user's client device. In step 1004, a component of system 100 (e.g., system 105 or client device 190) can receive a first image of a vehicle from an image sensor of the client device 190. In some embodiments, this image may then be transmitted to image recognizer 110 through network 170.

In step 1006, a component of system 100 (e.g., system 105 or client device 190) can match the first image to one or more images of vehicles in a database to identify the vehicle. The database can include records for vehicles located at the determined location. In some aspects, the database can include vehicle inventory information, such as a listing of every vehicle available at the dealership and related information. For example, related information may include a vehicle make, model, vehicle identification number, color, trim, mileage, and/or other identifying information of a vehicle. Related information may also include images of the exterior and/or interior of the vehicle. In some embodiments, related information can include the specific location of the vehicle in the dealership based on a map of the dealership lot.

In some embodiments, image recognizer 110 (or client device 190) can use match the first image to the one or more images in the database (e.g., as described above with regard to FIG. 7). The training of the machine learning algorithms and the performance of the matching processes may occur as described below with regards to FIGS. 16-18. For example, the first image may be matched to an image of a vehicle listed in the vehicle inventory of the dealership. As disclosed above, images that match may differ by less than a pre-defined threshold according to some measure of similarity. When more than one vehicle matches the first image, one of the images may be selected according to predetermined criteria (e.g., the first matching image, the most-similar image, the image matching the vehicle with the lowest or highest price). Once system 105 determines a match, the vehicle information for the matching vehicle can be retrieved from the database in step 1008.

In some embodiments, the component of system 100 performing the matching can be configured to request the user confirm the identified vehicle. For example, client device 190 can be configured to display image(s) of the matching vehicle(s) and a request that the user confirm the matches. As an additional example, system 105 can be configured to transmit image(s) of matching vehicle(s) to a client device of the user. System 105 can then receive a response indicating the correct vehicle (or indicating that none of the vehicles is the correct vehicle). In some embodiments, image recognizer 110 (or client device 190) may verify that the match relates to the correct vehicle by determining the expected location of the vehicle. For example, image recognizer 110 (or client device 190) may obtain a map of the dealership from database 180, including the expected location of each vehicle listed in the dealership inventory on the map. Image recognizer 110 (or client device 190) may further use geographical identification information embedded in the first image to determine a location of the imaged vehicle. For example, client device 190 may embed the first image with metadata providing geographic location information when the first image is captured. In some embodiments, image recognizer 110 (or client device 190) may compare the expected location of the identified vehicle with the determined location of the imaged vehicle to verify that the identified vehicle is correct.

In step 1010, a component of system 100 (e.g., system 105 or client device 190) can obtain comparison information based at least in part on the retrieved vehicle information. In some embodiments, the component can be configured to obtain comparison information from comparison resource 107. In some aspects, the component can be configured to retrieve pricing information from comparison resource 107 based on at least one of vehicle-related information and personal information. For example, the component can retrieve pricing information for vehicles similar to the identified vehicle or matching the identified vehicle. As a further example, the component can be configured to retrieve pricing information for individuals who recently leased or purchased vehicles similar to the identified vehicle or matching the identified vehicle in a similar geographic area. As an additional example, in some embodiments system 105 can be configured to receive at least some user information from the user. In some embodiments, the component can be configured to access a user account, such as the user accounts described above with regards to FIG. 1 and FIG. 9, to retrieve at least some user information. In various embodiments, client device 190 can obtain user information from the user. In some embodiments, system 105 can obtain user information from the user through the client device. In some aspects, system 105 can be configured to provide instructions to display a request for items of user information (e.g., credit score, income) or items affecting vehicle financing (desired finance amount, preferred term of financing or lease) to the client device. System 105 (or client device 190) can then retrieve pricing information for vehicles similar to the identified vehicle or matching the identified vehicle that were purchased or leased by individuals similar to the user. The similarity of the individuals to the user can be determined based on the received user information and the personal information stored by comparison resource 107. In this manner, comparison information can be obtained for similar or matching vehicles purchased or leased, or a subset of such vehicles. The obtained comparison information can be defined by recency, geography, or personal characteristics of the users leasing or purchasing the similar or matching vehicles.

In step 1012, a component of system 100 (e.g., system 105 or client device 190) can estimate a quote for the vehicle based on the vehicle information obtained in step 1008 and/or the comparison information obtained at step 1010 (e.g., as described above with regards to FIG. 8). In some aspects, the component can be configured to estimate one or more quotes based on the retrieved pricing information. In various aspects, the estimated quotes can be specific to particular financing options. For example, estimated quotes can be provided for auto purchase loans of different durations and/or auto lease arrangements of different durations. In this manner, estimated quotes can be determined based on the actual pricing terms provided to other individuals. In some embodiments, the estimated quotes can be statistics of the retrieved pricing information. For example, the estimated down payment and monthly payment for a 60 month auto loan for the identified vehicle can be the mean (or median) of the down payment and monthly payment for individuals financing matching vehicles (or similar individuals financing matching vehicles) with 60 month auto loans.

In some embodiments, the component can be configured to estimate one or more quotes in response to input received from client device 190. For example, the user can specify financing parameters and system 105 can estimate quotes in accordance with the specified parameters. For example, the user can select or modify a choice of leasing or loaning the vehicle; the term of the loan or lease; a down payment for the vehicle; and/or a service contract or gap insurance for the vehicle system 105 can estimate a quote for the vehicle based on this input.

In step 1014, system 100 can display the real-time quote on the client device 190. In some aspects, system 105 can transmit the one or more real-time quotes to client device 190 via network 170. In various aspects, the one or more quotes can be displayed on a user interface of client device 190. In some embodiments, the user interface may provide an augmented reality (AR) display. For example, client device 190 can be configured to display the quote superimposed on the image of the vehicle. For example, when client device 190 detects that the image sensor of client device 190 is positioned correctly, client device 190 can be configured to display the quote superimposed on or around the vehicle.

Figure 11:
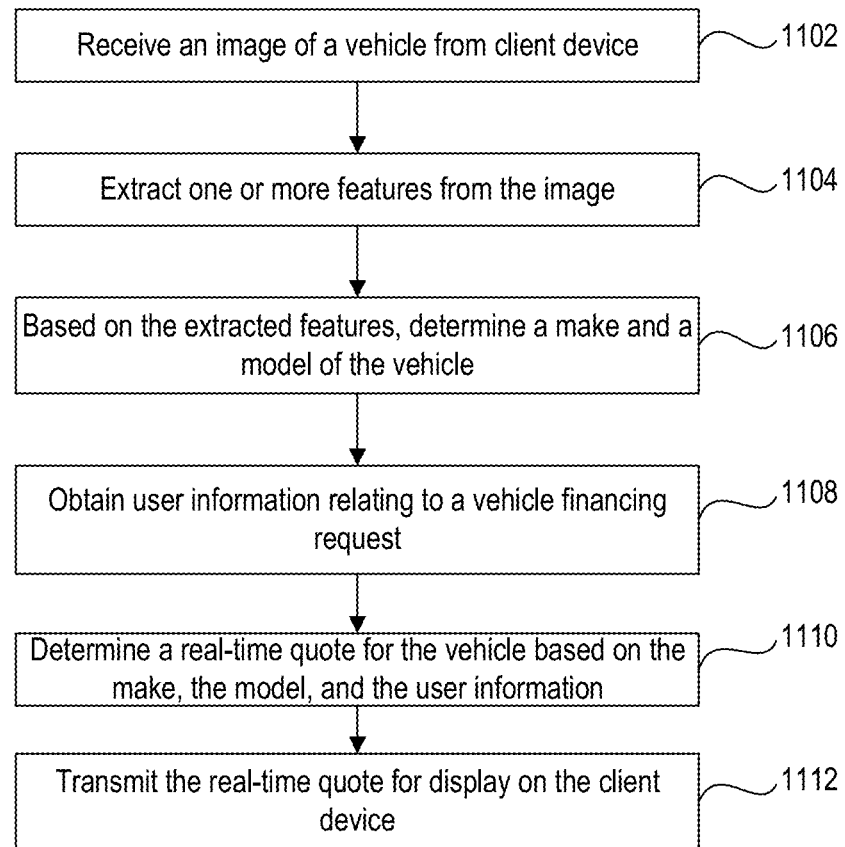
FIG. 11 is a flowchart of a third exemplary method for generating a real-time quote for a vehicle, consistent with embodiments of the present disclosure.

FIG. 11 is a flowchart of another exemplary method for generating a real-time quote for a vehicle, according to disclosed embodiments. In some embodiments, method 1100 may be carried out by one or more components of system 100 (e.g., system 105 and/or client device 190). In some aspects, method 1100 can proceed similarly to the methods described above with regards to FIGS. 4 and 5A.

In some embodiments, step 1102 may proceed as described above with regards to step 904 of FIG. 9. For example, in step 1102, a component of system 100 (e.g., client device 190 or system 105) can receive an image of a vehicle from image sensor 220. In some embodiments, this image may then be transmitted from client device 190 to image recognizer 110 through network 170.

In step 1104, a component of system 100 (e.g., client device 190 or system 105) can extract one or more features from the image (e.g., as described above with regards to FIGS. 5A and 6). In some embodiments, image recognizer 110 may use a machine learning algorithm, such as a convolutional neural network, to extract the one or more machine learning features. In some aspects, these features may indicate characteristics of the vehicle depicted in the image, such as a logo, a shape of headlights of the vehicle, a shape of taillights of the vehicle, a shape of a door of the vehicle, a shape of a window of the vehicle, a shape of a door handle of the vehicle, a shape of a tire of the vehicle, an overall shape of the vehicle (e.g., its front profile, rear profile, side profile, overhead profile, etc.), or similar characteristics. In various aspects the features can indicate characteristics of the image, such as a particular arrangement of pixels, a particular color shift, a bounding box size of an object in the image, a shape of an object in the image, or the like.

In step 1106, based on the extracted features and using a machine learning algorithm, a component of system 100 (e.g., client device 190 or system 105) can determine attributes of the vehicle (e.g., as described above with regards to FIGS. 5A and 6). In some embodiments, attributes of the vehicle can include make and model of the vehicle. In such embodiments, the attributes can further include a year of the vehicle and/or a trim of the vehicle. In some embodiments, image recognizer 110 may use the same machine learning algorithm as in step 1104 (e.g., a convolutional neural network that outputs attributes based on features).

In some embodiments, steps 1108-1112 may proceed as described above with regards to steps 910-914 of FIG. 9. For example, in step 1108, a component of system 100 (e.g. client device 190 or system 105) can obtain user information relating to a vehicle financing request. In some embodiments, the user can create a user account and can submit an application to pre-qualify for vehicle financing. Additionally or alternatively, the component can display (or transmit for display on the client device) a vehicle financing application form to obtain the user information in step 1108.

In step 1110, a component of system 100 (e.g., client device 190 or system 105) can determine a real-time quote for the vehicle based on the make and the model obtained at step 1106 and the user information obtained at step 1108. In some embodiments, the real-time quote includes pricing information relating to the identified vehicle. For example, the pricing information may include a vehicle price, monthly payment amount, APR, term length, and/or amount financed. In this manner, the real-time quote can be personalized based on the information obtained from the user in step 1108 (e.g., through pre-qualification and/or a questionnaire). As a non-limiting example, the real-time quote can reflect the user's credit, the amount desired to finance, and/or the preferred term length.

In step 1112, a component of system 100 (e.g., client device 190 or system 105) can display (or transmit for display on the client device 190) the real-time quote. In some embodiments, the user may manipulate different factors to determine how the quote is affected. For example, the user may add, remove, or make changes to a service contract, gap insurance, or down payment to determine the effect on payment options, APR, and/or monthly payments relating to the quote.

Figure 12:
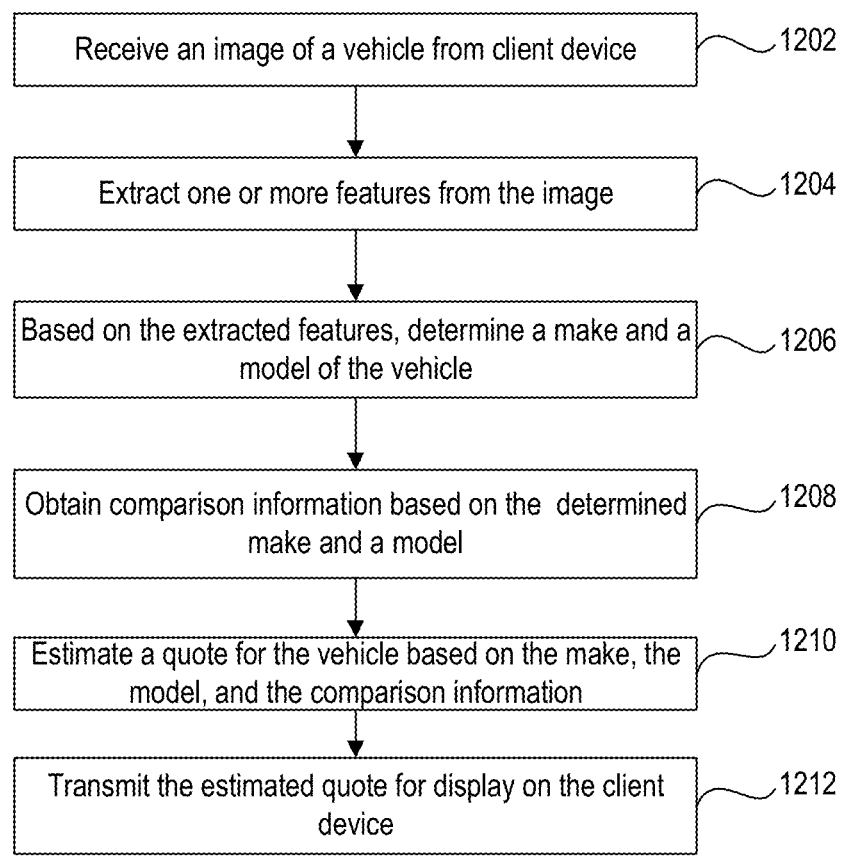
FIG. 12 is a flowchart of a fourth exemplary method for generating a real-time quote for a vehicle, consistent with embodiments of the present disclosure.

FIG. 12 is a flowchart of another exemplary method 1200 for generating a real-time quote for a vehicle, according to disclosed embodiments. In some embodiments, method 1200 may be carried out by one or more components of system 100 (e.g., client device 190 or system 105). In some aspects, method 1200 can proceed similarly to the methods described above with regards to FIGS. 4, 5A, and 8.

In some embodiments, steps 1202-1206 may proceed as described above with regards to steps 1102-1106 of FIG. 11. For example, in step 1102, a component of system 100 (e.g., client device 190 or system 105) can receive an image of a vehicle from image sensor 220. In some embodiments, this image may then be transmitted to from client device 190 to image recognizer 110 through network 170. In step 1204, the component can extract one or more features from the image (e.g., as described with regards to FIGS. 5A and 6). In step 1206, the component may determine attributes of the vehicle (e.g., make and model) based on the extracted features and using a machine learning algorithm (e.g., as described with regards to FIGS. 5A and 6).

In some embodiments, steps 1208-1212 may proceed in a manner similar to that described above with regards to steps 1010-1014 of FIG. 10. For example, in step 1208, a component of system 100 (e.g., client device 190 or system 105) can obtain comparison information based at least in part on the attributes determined in step 1106. In some embodiments, the component can be configured to obtain comparison information from comparison resource 107. In some aspects, the component can be configured to retrieve pricing information from comparison resource 107 based on at least one of vehicle-related information and personal information. For example, the component may retrieve pricing information for vehicles having the same or similar attributes as those determined. Further, as described above in relation to FIG. 5, in some embodiments the component may be configured to receive at least some user information from the user (e.g., via client device 190), and/or retrieve such information from a user account (e.g., a user account of system 105). In such embodiments, the component may be configured to retrieve pricing information for vehicles having the same or similar attributes as those determined in step 1206 that were purchased or leased by individuals similar to the user. The similarity of the individuals to the user can be determined based on the received user information and the personal information stored by comparison resource 107. In this manner, as described above with regards to step 1010, the obtained subset of comparison information can be defined by recency, geography, or personal characteristics of the users leasing or purchasing the similar or matching vehicles In step 1210, a component of system 100 (e.g., client device 190 or system 105) can estimate a quote for the vehicle based on specific vehicle information and the comparison information obtained at step 1208 (e.g., as described with regards to FIG. 8). Step 1210 may be performed in a manner similar to that described above in relation to step 1012. For example, the estimated quotes may be specific to particular financing options such as auto purchase loans of different durations and/or auto lease arrangements of different durations, and may leverage statistics of the retrieved pricing information. As described above in step 1012, in some embodiments, the component can be configured to estimate one or more quotes in response to input received from client device 190.

In step 1212, a component of system 100 (e.g., client device 190 or system 105) can display (or transmit for display on the client device 190) one or more quotes. Step 1212 may be performed in a manner similar to that described above in relation to step 1014. For example, as above, the one or more estimated quotes may be transmitted via network 170 and may be displayed on a user interface of client device 190. In some embodiments, the user interface may provide an augmented reality (AR) display.

FIG. 13 depicts an illustration of an exemplary client device capturing an image of a vehicle, in accordance with disclosed embodiments. As disclosed above, the client device 190 may be a mobile device, a tablet, a laptop, a cellular device, a personal computer, a smartphone (e.g., Apple iPhone, Blackberry, Android-based phones, etc.), and/or a wearable smart device such as a smart watch. The client device 190 may include an image sensor 220 such as a camera. A user of the client device may capture an image of a vehicle 1302 using image sensor 220 of client device 190. The vehicle image may be displayed on a user interface 1304 of the client device display.

Figure 14:
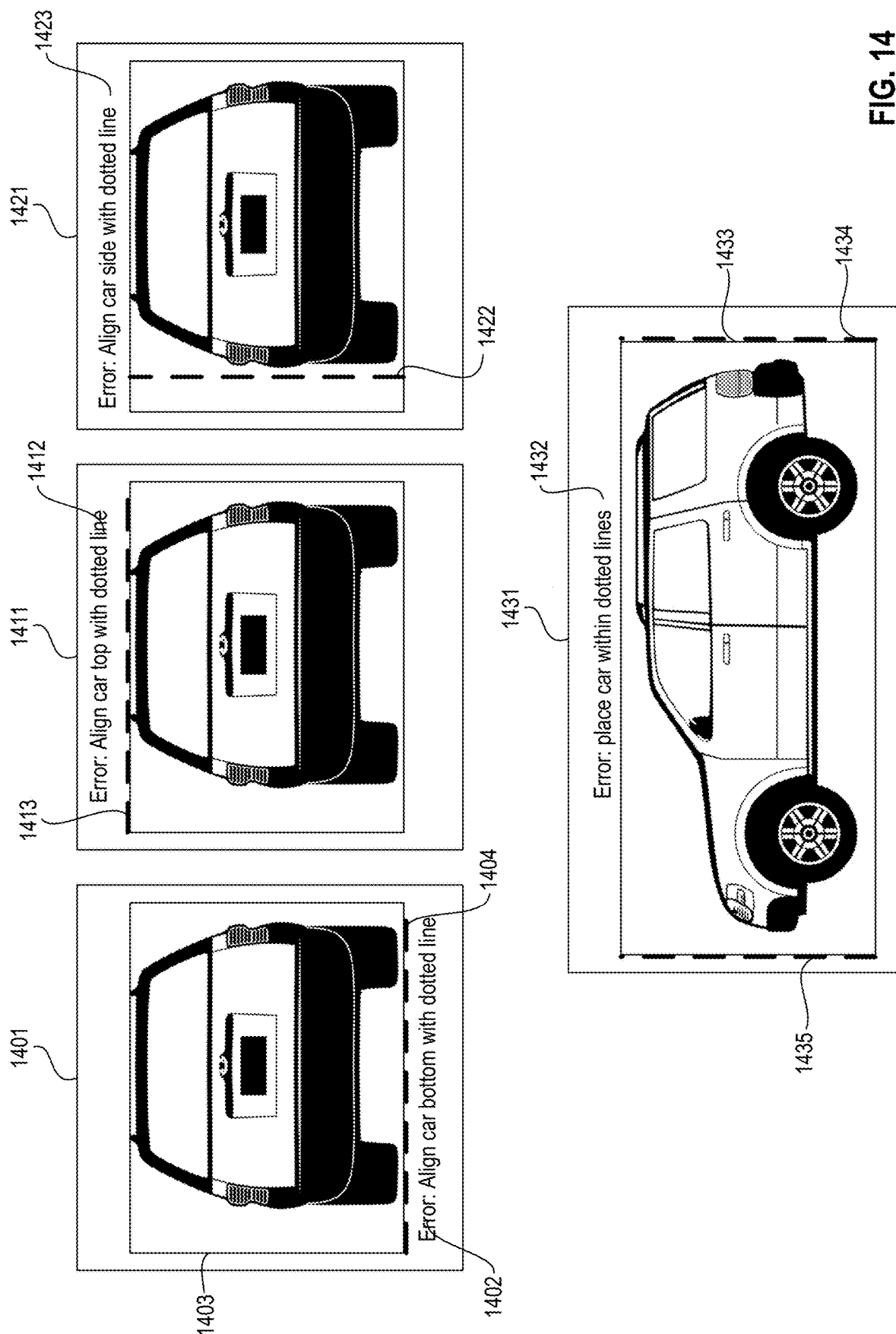
FIG. 14 is a group of exemplary graphical user interfaces capturing vehicle images, in accordance with disclosed embodiments.

FIG. 14 depicts a group of exemplary graphical user interfaces capturing vehicle images, according with disclosed embodiments. In some embodiments, the exemplary graphical user interfaces may be displayed on client device 190 and may take the image from image sensor 220 and modify it to include elements displayed in a user interface on client device 190. In some embodiments, the exemplary graphical user interfaces may be displayed when a user opens an application running on client device 190, activating the image sensor 220.

Graphical user interface 1401 shows an interface with a vehicle within a rectangular guide 1403, a picture guide 1404, and a displayed message 1402. Rectangular guide 1403 may have color selected to highly contrast the original image. Similarly, picture guide 1404 may be generated when server system 105 determines that the picture quality is poor and cannot be processed. In some embodiments, picture guide 1404 may be displayed when server system 105 determines that the captured image is below an acceptability threshold and displays an error message and/or a message instructing the user to capture another image of the vehicle in a better position so the image can be accepted.

While graphical user interface shows a guide 1404 and message 1402 in the bottom, the guide and message may also be on the top like guide 1413 and message 1412, or also in the side, like guide 1422, or any combination, such as the guide 1422 on the side with message 1423 on the top. Therefore graphical user interfaces 1411 and 1421 show alternative graphical user interfaces with similar elements arranged in different positions. Server system 105 can be configured to select the position of elements in the graphical user interface to facilitate interactions with the user.

In other embodiments, the exemplary graphical user interfaces can modify an image of a vehicle including a first guide 1435 and a second guide 1434. For example, graphical user interface 1431 presents the side of the vehicle and a displayed message 1432 to position the front and back of the vehicle between the first guide 1435 and second guide 1434.

Figure 15:
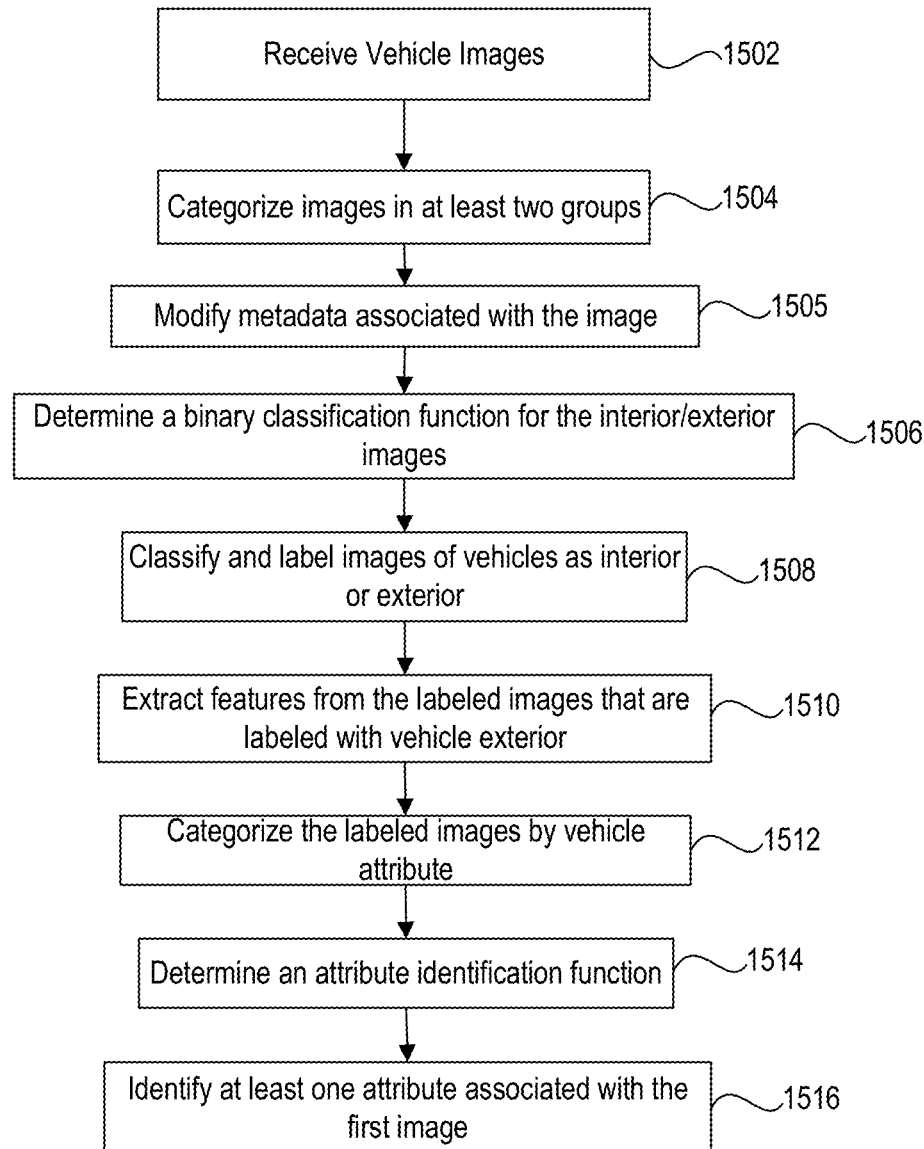
FIG. 15 is an exemplary flow chart illustrating an identification process, in accordance with disclosed embodiments.

FIG. 15 is an exemplary flow chart illustrating an identification process, in accordance with disclosed embodiments. In some embodiments, identification process 1500 may be executed by server system 105.

Server system 105 may receive a plurality of images to generate an attribute identification function in step 1502. These images may be collected by image classifier 130. In some aspects these images may be scraped from, for example, websites and/or inventories of vehicle dealers or vehicle manufacturers. The collected images may be associated with metadata describing the type of image and whether the image is exterior or interior.

In step 1504, server system 105 may categorize images into at least two clusters. For example, server system 105 may extract features from images and cluster the images based on the extracted features in a binary fashion, that is, into two clusters. For example, image classifier 130 may implement clustering techniques, such as DBSCAN, to classify images. In some embodiments, this classification may cluster images of vehicle interiors and images of vehicle exteriors into two different clusters. In some embodiments, server system 105 may eliminate images that cannot be classified.

In step 1505, server system 105 may modify metadata associated with images based on their classification in step 1504. For example, image classifier 130 may insert comments like "exterior" or "interior" in the metadata associated with images based on the clustering. In some embodiments, image classifier 130 may implement a convention that later facilitates sorting the labeled images. For instance, instead of adding notes to the metadata such as "interior" and "exterior," the file name of the images may be changed with a convention such as "1" for interior and "0" for exterior.

In step 1506, server system 105 may determine a classification function for the clustered images. For example, image classifier 130 may generate a logistic regression classifier based on image features and the labels created in step 1505. In some embodiments, the classification may be binary, and the linear regression may be configured to categorize images into one of the two clusters. For example, the classification function may classify images of vehicle exteriors into a "vehicle exterior" cluster. As an additional example, the classifier may classify vehicle interiors into another cluster. In some embodiments, this other cluster may include all images not classified as a vehicle exterior (e.g., images of vehicle interiors, images of subject matter other than vehicles, etc.).

In step 1508, server system 105 may receive a second group of images and classify them using the classification function determined in step 1506. For example, a logistic regression classifier determined in step 1506 may be used to classify the second group of images. In some embodiments, the second group of images may include associated metadata. For example, the metadata of the second group of images may include information about attributes of the vehicle such as vehicle make, model, and/or trim. In some embodiments, server system 105 may classify the second group of images as images of vehicle interior or vehicle exterior based on the classification function. In such embodiments, server system 105 may use the images classified as vehicle exterior for training a machine learning algorithm. By using the images classified as vehicle exterior to generate a model, server system 105 can reduce the resources devoted for image preprocessing and improve model generation speed.

In step 1510, server system 105 may extract features from labeled images. For example, image classifier 130 may apply a pre-trained convolution network to extract features from the labeled images, which may comprise images from the second group labeled with vehicle "exterior" (that is, images classified as exterior by the classification function).

In step 1512, server system 105 may categorize the labeled images based on one or more vehicle attributes (e.g., vehicle make, model, year, and trim). Furthermore, in step 1512 server system 105 may generate a new file with categorized images. For example, server system 105 may generate one or more files indicating the categories of the images. As a non-limiting example, the one or more files can include one or more binary tables. These binary tables can include images as rows (or columns) and categories as columns (or rows). In this non-limiting example, membership of images in categories can be indicated by the values of the element at the tables.

In step 1514, based on the categorized images, server system 105 may generate an attribute function, consistent with disclosed embodiments. The attribute function can be configured to use features extracted from an image of the exterior of a vehicle to identify attributes of the vehicle. For example, the attribute function can be configured to identify the make and model of the depicted vehicle. As an additional example, the attribute function can be configured to further identify the trim and/or year of the depicted vehicle.

The attribute function may comprise one or more layers in a convolutional neural network that also extracts the features from the image. Alternatively, the attribute function may comprise a second convolutional distinct neural network configured to receive the output (or the output of a particular middle layer) of a first convolutional neural network that extracts the features from the image.

In step 1514 server system 105 may, in some embodiments, determine the attribute identification function using training images and a result file. Server system 105 may partition the categorized images of step 1512 into at least training images and validation images. Server system 105 can train the attribute function using an input file including extracted features for the training images and a result file including the binary table entries for the training images. Training can include determining or adjusting parameters of the attribute identification function. For example, when the attribute identification function includes a neural network, training can include updating weights and offsets of the neural network using to a backpropagation algorithm. Server system 105 can train the attribute function until a cost function based on prediction error is below a threshold value. Server system 105 can validate the attribute identification function using the validation images.

In step 1516, a component of system 100 (e.g., system 105 or client device 190) may use the attribute function determined in step 1514 to identify at least one attribute associated with a first image received from client device 190 (e.g., as described above with regard to FIG. 6). In some embodiments, server system 105 may receive an image or a video feed from client device 190. In such embodiments, server system may identify attributes from the images using the attribute identification function. For example, server system 105 may receive an image of a vehicle or a video feed showing a vehicle from client device 190. Server system 105 may then extract features from the image, using for example, image recognizer 110 (or a convolutional neural network thereof) and input the features to the attribute identification function (which may comprise an output layer of the convolutional neural network or a separate neural network). The attribute identification function may then return attributes of the vehicle in the image such as the vehicle's make and model.

In some embodiments, once attributes of the image are identified in step 1516, server system 105 may retrieve additional information. For example, using the identified information, server system 105 may search in database 180 for information relating to the identified vehicle given the identified attributes, including price information. In other embodiments, server system 105 may search for cost and condition information in online resource 106 For example, server system 105 may send an information query to websites such as Kelly Blue Book® to collect cost and condition information. In yet other embodiments, server system 105 may send queries to dealer or vehicle manufacturer websites to collect additional information of the vehicle.

Figure 16:
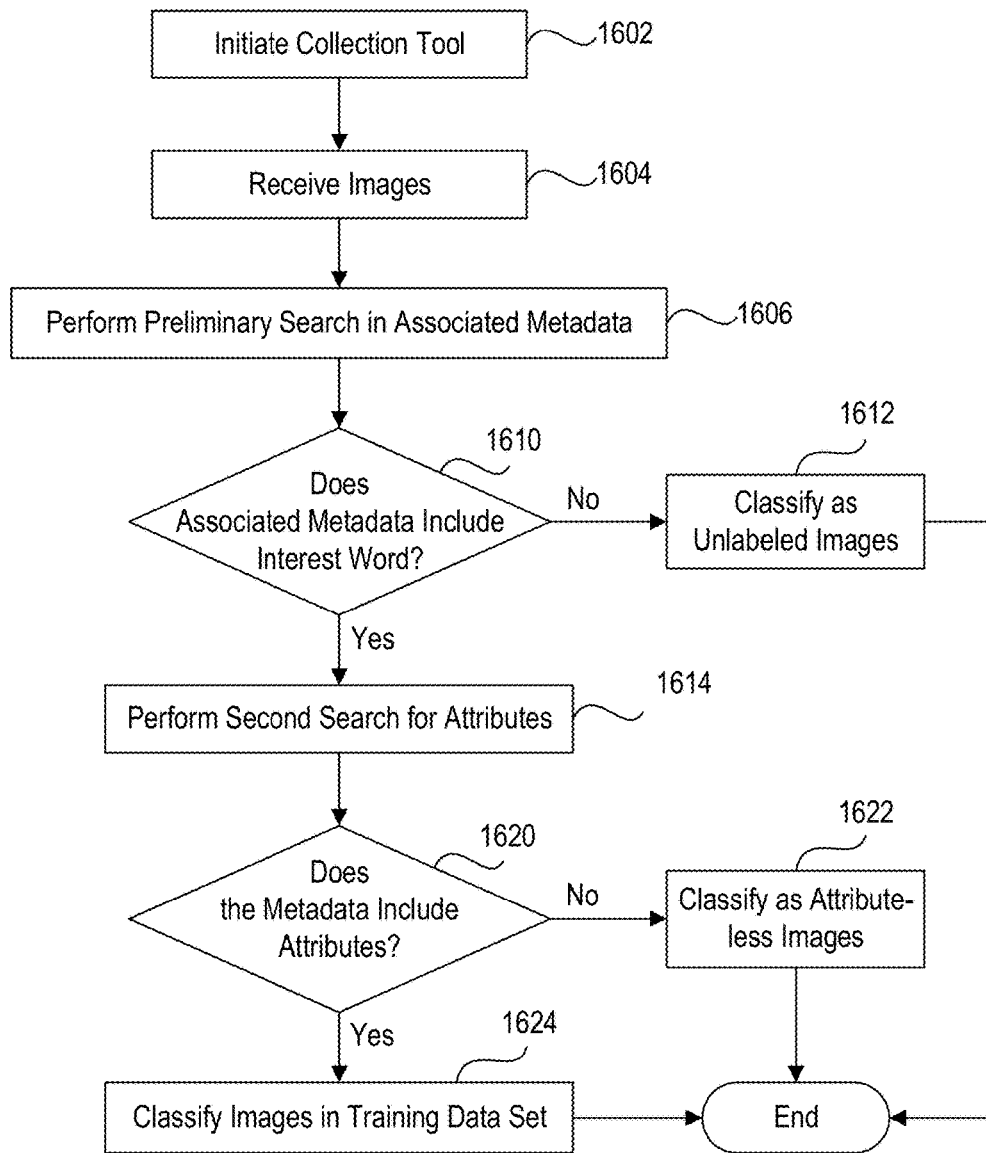
FIG. 16 is an exemplary flow chart illustrating a training data set generation process, in accordance with disclosed embodiments.

FIG. 16 is an exemplary flow chart illustrating a training data set generation process, in accordance with disclosed embodiments. In some embodiments generation process 1600 may be carried out by server system 105. In such embodiments, generation process 1600 may be carried out by image classifier 130.

In step 1602, server system 105 may initiate an image collection tool. In some embodiments, the image collection tool may be a web scraper configured to collect images from websites. In other embodiments, collection tool may include a file synchronization tool that is connected to, for example, online resource 106. In such embodiment, the image collection tool may copy image files in a memory such as memory 160.

In step 1604, server system 105 may receive a plurality of images. In step 1604, server system 105 may compress images or create a new file to efficiently store the plurality of collected images. For example, in step 1604 server system 105 may store images in a new file in that reduces the color space to the most common colors in the image. Alternatively, server system 105 may modify pixels in the image so they only reference an index color, or to combine pixels with dithering. Other compression techniques to generate new files are also possible once the plurality of images is received in step 1604.

In some embodiments, the newly generated file at step 1604 may change brightness by averaging or dropping some of the chrominance information in the image. In yet other embodiments, the new file may be generated by employing a Fourier-related transform such as the Discrete Cosine Transform (DCT), wavelet transform, or Fractal compression to generate a new file that more efficiently store the collected images to generate the models.

In step 1606, server system 105 may perform a preliminary search in metadata associated with the collected images. For example, server system 105 may search for keywords in the metadata or search for XML information. Because the number of collected images may be very large to train the machine learning algorithm, performing a preliminary search, instead of a full search in the metadata, may save computer resources and accelerate the classification process.

In step 1610, server system 105 may determine whether the associated metadata includes a word of interest based on the preliminary search. If the metadata does not include a word of interest (step 1610: No), server system 105 may continue to step 1612, classifying the image as unlabeled, and/or discarding it. If instead the metadata includes a word of interest (step 1610: Yes), server system 105 may continue to step 1614 and perform a second search for attributes in metadata. A "word of interest" may include any vehicle-related word such as "exterior," "interior," "car," "vehicle," "front view," "side view," "rear view," "Ford," "Honda," "2006," "2007," "XL," "4 L," "horsepower," or the like. Such staggered search for metadata improves computer functionality by minimizing the resources that are used to classify images creating a stratified approach that quickly identifies images that are not of interest and then devoting more resources to images that overcome an initial threshold. Indeed, because the determination in step 1610 may be performed with specialized computers, such as FPGAs, specifically programmed to perform the keyword search in metadata, process 1600 may improve the overall speed of the server system 105.

In step 1620, server system 105 may determine whether the metadata includes information about a classification of the vehicle and/or attributes of the vehicle. For example, in step 1620 server system 105 may determine that the word "exterior" is in the comments section of the metadata associated with a group of images and determine that the metadata includes a classification. Similarly, server system 105 may determine that the word "Accord" is in the comments section of the metadata associated with a group of images and determine that the metadata includes an attribute (in this case, that the "model" attribute has the value "Accord"). Alternatively or additionally, server system 105 may identify that the metadata has information about the image source (e.g., from "www.ford.com") and correlate it to a vehicle maker attribute (e.g., a make of "Ford").

If server system 105 determines the metadata does not include a classification and/or attributes (step 1620: No), server system 105 may continue to step 1622 and classify the image as attribute-less. However, if server system 105 determines that the metadata includes a classification and/or attributes (step 1620: yes), server system 105 may continue to step 1624 and classify the images in a labeled trained data set that may later be used to generate a machine learning classifier, such as a convolutional neural network or a logistic regression classifier.

Figure 17:
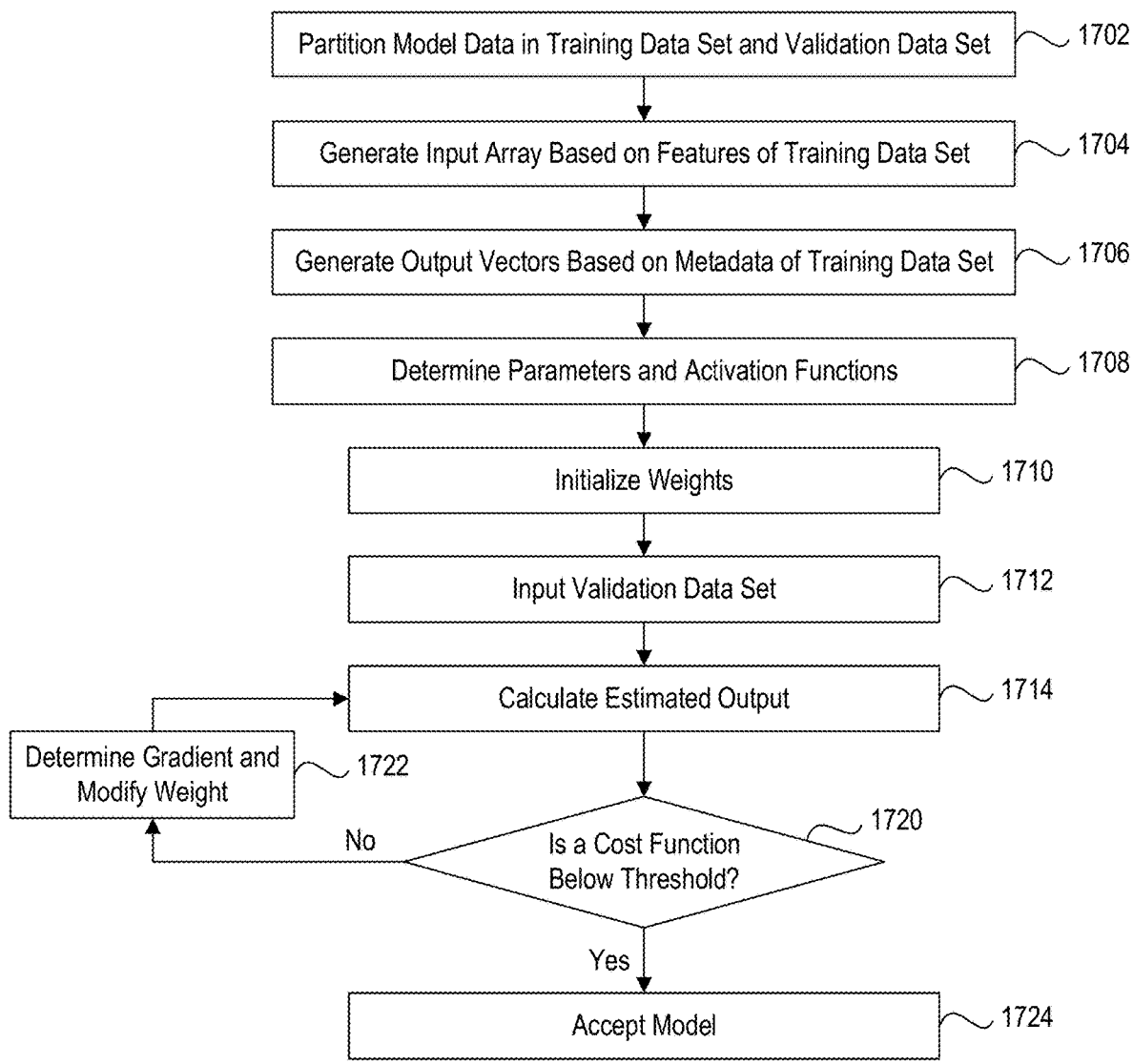
FIG. 17 is an exemplary flow chart illustrating a process for generating an identification model, in accordance with disclosed embodiments.

FIG. 17 is an exemplary flow chart illustrating a process for generating an identification model, in accordance with disclosed embodiments. Process 1700 may be performed by server system 105 and configured to generate classification models, such as convolutional neural networks, traditional neural networks, or logistic regression classifiers, to identify images.

In step 1702, server system 105 may partition model data in a training data set and a validation data set. For example, server system 105 may receive a plurality of images of the exterior of vehicles. The images may be associated with metadata describing attributes of the vehicle in the image. Server system 105 may divide the images of the exterior of the vehicles and generate two groups, one to train the model and a second to validate the model.

In step 1704, server system 105 may generate an input array based on features of the training data set. For example, server system 105 may generate a variable comprising feature information of images in the training data set. For example, the feature information for an image may be extracted from the image using a first convolutional neural network.

In step 1706, server system 105 may generate output vectors based on metadata of the training data set. For example, based on the images in the training data set, the server system may generate a desired output vector identifying vehicle make and model that is included in the training data set.

In step 1708, server system 105 may determine one or more parameters (e.g., weights) and/or activation functions to initialize the model to be created. For example, server system 105 may receive, from a trainer, the initializing values as well as a number of layers and nodes, and whether the network will be fully or partially connected. Alternatively, server system 105 may determine the initializing values for a number of layers and nodes that were previously determined by the trainer. In any of the embodiments above, the trainer may also have determined the dimensionality of the network and/or a pixel sampling size.

Moreover, in step 1708 server system 105 may receive, from a trainer, an indication of one or more activation functions for use in the model. For example, server system 105 may receive, from a trainer, an indication of that the model should use sigmoidal activation functions. Moreover, in step 1710 server system 105 may receive, from a trainer, initial values or an indication of initial values for parameters (e.g., weights, offsets, etc.) of the model.

In step 1712, server system 105 may apply the input array based on features of training data set of step 1704 to calculate an estimated output in step 1714 and a cost function. In step 1720, server system 105 may determine whether the cost function is below a threshold of required accuracy, which may be specified by the user. If server system 105 determines that the cost function is not below a threshold and the required accuracy has not been achieved, server system 105 may continue to step 1722 and determine a gradient to modify weights in synapsis and/or modify the activation functions in the different nodes. However, if the cost function if below a threshold (step 1720: yes), server system 105 may accept the model in step 1724.

Figure 18:
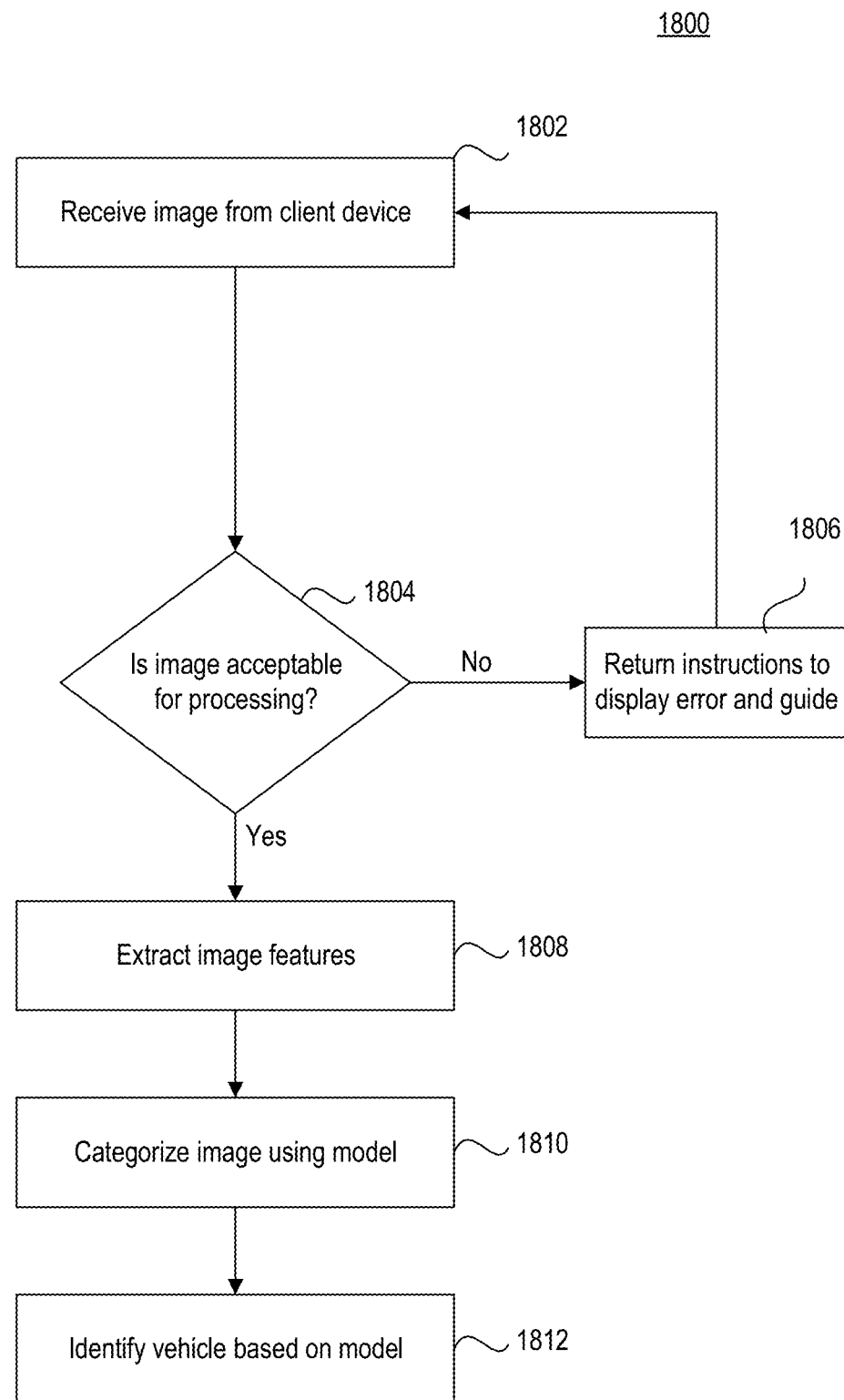
FIG. 18 is an exemplary flow chart illustrating a process for handling a request for identification.

FIG. 18 is an exemplary flow chart illustrating a process for handling a request for identification (e.g., similar to the method described with respect to FIG. 6). In some embodiments, process 1800 may be performed by a component of system 100 (e.g., server system 105 or client device 190).

In step 1802, the component may receive an image or a video feed from image sensor 220 (or from client device 190). In other embodiments, server system 105 may receive the image or video from online resource 106.

In step 1804, server system 105 may determine whether the image is acceptable for processing. For example, server system 105 may perform a validity assessment of whether the contrast in the image is high enough or whether the format of the image can be processed. In some embodiments, server system 105 may determine if the image displays a full vehicle by, for example, analyzing contrast in the image.

If the image is not acceptable for processing (step 1804: No), server system 105 may continue to step 1806 and return instructions to display an error message in client device 190. In some embodiments, server system 105 may additionally return instructions to display an onscreen guide to help the user to take an acceptable image for processing. For example, server system 105 may generate an image to superimpose on the client screen indicating an error and presenting a guide to take a subsequent image.

However, if the image is acceptable for processing (step 1804: yes), server system may continue to step 1808 and extract image features. For example image classifier 130 may import layers of a first convolutional neural network; determine features described in a target layer of the first network, and initialize a multi class fitting model (e.g., a second convolutional neural network) using the features in the target layer.

In step 1810, server system 105 may request an identification model to identify attributes in the image. In some embodiments, image recognizer 110 may use the identification model to identify attributes in the image. For example, the convolutional neural network of step 1808 may further include layers for determining a vehicle make and model. Alternatively or additionally, image recognizer 110 may apply a second convolutional neural network to determine a vehicle make and model from the features extracted by the first convolutional neural network. In step 1812, the server system 105 may fully identify the vehicle based on the determined make and model (and/or other determined attributes such as year or trim).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A computer-implemented method for processing an image including a vehicle using machine learning, the method comprising:
    determining a location of a client device;
    mapping the location of the client device to a vehicle dealership;
    receiving a first image of a vehicle from an image sensor of the client device;
    inputting the first image to a first input layer of a first convolutional neural network;
    extracting one or more features of the first image from a first output layer using the first convolutional neural network;
    inputting the extracted features to a second input layer of a second convolutional neural network;
    determining a make and a model of the vehicle from a second output layer of the second convolutional neural network;
    identifying one or more vehicles in a vehicle database of the vehicle dealership based on the determined make and model of the vehicle, the vehicle database listing vehicles located at the vehicle dealership;
    retrieving vehicle information associated with the one or more vehicles from the vehicle database;
    generating user specific information associated with the identified one or more vehicles; and
    transmitting the user specific information for display on the client device.

2. The method of claim 1, wherein the client device is one of a desktop computer, laptop, server, mobile device, gaming device, or wearable computing device.

3. The method of claim 1, wherein the image sensor is configured to capture images or videos.

4. The method of claim 1, wherein at least one of the first or second input layer comprises at least one matrix.

5. The method of claim 1, where in the first convolutional neural network includes at least one convolutional layer.

6. The method of claim 5, wherein the at least one convolutional layer is configured to convolve one or more spatial filters with the convolutional layer input to generate a convolutional layer output tensor.

7. The method of claim 6, wherein the spatial filter is defined by a matrix of weights applied to each element of the convolutional layer.

8. The method of claim 1, wherein the vehicle information comprises vehicle attributes.

9. The method of claim 1, wherein the first convolutional neural network is distinct from the second convolutional neural network.

10. The method of claim 1, wherein the operations further comprise calculating a metric based on the extracted features, wherein the metric indicates a degree of similarity between the images.

11. An image processing system including a vehicle using machine learning, comprising:
    at least one processor; and
    at least one storage medium containing instructions that, when executed by the at least one processor, cause the image processing system to perform operations comprising:
        determining a location of a client device;
        mapping the location of the client device to a vehicle dealership;
        receiving a first image of a vehicle from an image sensor of the client device;
        inputting the first image to a first input layer of a first convolutional neural network;
        extracting one or more features of the first image from a first output layer using the first convolutional neural network;
        inputting the extracted features to a second input layer of a second convolutional neural network;
        determining a make and a model of the vehicle from a second output layer of the second convolutional neural network;
        identifying one or more vehicles in a vehicle database of the vehicle dealership based on the determined make and model of the vehicle, the vehicle database listing vehicles located at the vehicle dealership;
        retrieving vehicle information associated with the one or more vehicles from the vehicle database;
        generating user specific information associated with the identified one or more vehicles; and
        transmitting the user specific information for display on the client device.

12. The system of claim 11, wherein the operations further comprise retrieving one of general customer information, specific vehicle information, and specific customer information associated with the one or more vehicles from the vehicle database.

13. The system of claim 12, wherein the general customer information includes financing terms for the identified vehicle.

14. The system of claim 12, wherein the specific vehicle information includes the price and available rebate information for a vehicle.

15. The system of claim 12, wherein the specific customer information includes prequalification information for a customer.

16. The system of claim 11, wherein the general vehicle information includes general pricing information.

17. The system of claim 11, wherein the vehicle database contains vehicle inventory information for a particular vehicle dealership located at the determined location.

18. The system of claim 17, wherein the vehicle inventory information includes a list of every vehicle available at the dealership and related information.

19. The system of claim 18, wherein the related information includes at least one of a vehicle make, vehicle model, vehicle identification number, color, trim, or mileage.

20. The system of claim 18, wherein the related information includes the specific location of the vehicle in the dealership based on a map of the dealership lot.

* * * * *